US010612299B2

(12) United States Patent
Chen et al.

(10) Patent No.: US 10,612,299 B2
(45) Date of Patent: Apr. 7, 2020

(54) CONTROL DEVICE OF WINDOW COVERING SYSTEM

(71) Applicant: Nien Made Enterprise Co., Ltd., Taichung (TW)

(72) Inventors: Lin Chen, TaiChung (TW); Keng-Hao Nien, TaiChung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 302 days.

(21) Appl. No.: 15/407,221

(22) Filed: Jan. 16, 2017

(65) Prior Publication Data
US 2017/0211321 A1   Jul. 27, 2017

Related U.S. Application Data

(60) Provisional application No. 62/318,771, filed on Apr. 6, 2016, provisional application No. 62/326,020, filed on Apr. 22, 2016.

(30) Foreign Application Priority Data

Jan. 22, 2016  (CN) ............ 2016 2 0065142 U
Jan. 29, 2016  (CN) ............ 2016 2 0094802 U

(51) Int. Cl.
*E06B 9/322* (2006.01)
*E06B 9/262* (2006.01)
(Continued)

(52) U.S. Cl.
CPC ......... *E06B 9/322* (2013.01); *B65H 75/4434* (2013.01); *B65H 75/4492* (2013.01);
(Continued)

(58) Field of Classification Search
CPC ............ E06B 9/322; E06B 2009/3222; E06B 2009/3225; E06B 9/323
See application file for complete search history.

(56) References Cited

U.S. PATENT DOCUMENTS 4,681,279 A   7/1987   Nakamura
5,123,472 A   6/1992   Nagashima et al.
(Continued)

FOREIGN PATENT DOCUMENTS

AU       782302 B2      7/2005
AU    2012370499 A1     9/2014
(Continued)

OTHER PUBLICATIONS

Eddy Current Brake, published Jul. 2, 2015, accessed Jan. 15, 2019 from https://en.wikipedia.org/wiki/Eddy_current_brake (Year: 2015).*

*Primary Examiner* — Katherine W Mitchell
*Assistant Examiner* — Jeremy C Ramsey
(74) *Attorney, Agent, or Firm* — Muncy, Geissler, Olds & Lowe, P.C.

(57) ABSTRACT

A control device reduces an expansion speed of a covering material of a window covering system. The window covering system comprises the control device, the covering material and a weight member attached below the covering material to provide a weight force to the covering material. The control device comprises a driving module, a lifting module comprising a winding device configured to operate with the drive member and the covering material simultaneously, a damping module configured to operate with the winding device in only one direction for providing a damping force to the winding device selectively; wherein the damping force is provided to the winding device for reducing the expansion speed of the covering material when the winding device is rotated in the first direction; and wherein no damping force is provided to the winding device when the winding device is rotated in a second direction opposite to the first direction.

14 Claims, 30 Drawing Sheets

(51) Int. Cl.
  *B65H 75/44* (2006.01)
  *B65H 75/48* (2006.01)
  *E06B 9/60* (2006.01)
  *F16F 9/10* (2006.01)
  *E06B 9/80* (2006.01)

(52) U.S. Cl.
  CPC ........... *B65H 75/486* (2013.01); *E06B 9/262* (2013.01); *E06B 9/60* (2013.01); *F16F 9/10* (2013.01); *E06B 2009/2627* (2013.01); *E06B 2009/3222* (2013.01); *E06B 2009/808* (2013.01); *F16F 2222/12* (2013.01)

(56) References Cited

U.S. PATENT DOCUMENTS

| | | | |
|---|---|---|---|
| 6,129,131 | A | 10/2000 | Colson |
| 6,155,328 | A | 12/2000 | Welfonder |
| 6,332,491 | B1 | 12/2001 | Rossini |
| 6,715,528 | B2 | 4/2004 | Rossini |
| 6,948,544 | B2 | 9/2005 | Nien |
| 6,955,207 | B2 | 10/2005 | Minder |
| 7,198,089 | B2 | 4/2007 | Hsu |
| 7,341,091 | B2 | 3/2008 | Nien |
| 7,406,995 | B2 | 8/2008 | Huang |
| 7,578,334 | B2 | 8/2009 | Smith et al. |
| 7,717,154 | B2 | 5/2010 | Cheng |
| 8,230,896 | B2 | 7/2012 | Anderson |
| 8,267,145 | B2 | 9/2012 | Fraser |
| 9,062,492 | B2 | 6/2015 | Yu |
| 9,127,500 | B2 | 9/2015 | Huang |
| 9,284,774 | B2 | 3/2016 | Yu et al. |
| 2009/0078380 | A1 | 3/2009 | Cheng |
| 2009/0120592 | A1 | 5/2009 | Lesperance |
| 2011/0290429 | A1 | 12/2011 | Cheng |
| 2013/0037225 | A1 | 2/2013 | Huang |
| 2013/0087415 | A1 | 4/2013 | Hsieh |
| 2014/0083631 | A1 | 3/2014 | Huang |
| 2014/0131502 | A1 | 5/2014 | Zhu |
| 2014/0291431 | A1 | 10/2014 | Huang |
| 2015/0059992 | A1 | 3/2015 | Liu |
| 2015/0136336 | A1* | 5/2015 | Huang ................ E06B 9/322 160/170 |
| 2015/0211296 | A1 | 7/2015 | Zhang et al. |
| 2015/0354275 | A1 | 12/2015 | Huang et al. |
| 2015/0368968 | A1 | 12/2015 | Smith |

FOREIGN PATENT DOCUMENTS

| | | |
|---|---|---|
| CA | 2805798 A1 | 8/2014 |
| CN | 1366124 A | 8/2002 |
| CN | 101021139 B | 7/2010 |
| CN | 203584273 U | 5/2014 |
| CN | 204552565 U | 8/2015 |
| DE | 202007002787 U1 | 7/2008 |
| JP | H04250287 A | 9/1992 |
| JP | 1993018168 A | 1/1993 |
| JP | H08177350 A | 7/1996 |
| JP | H11187973 A | 7/1999 |
| JP | 2000145328 A | 5/2000 |
| JP | 2000220369 A | 8/2000 |
| JP | 2001008407 A | 1/2001 |
| JP | 3261106 B2 | 2/2002 |
| JP | 2002106268 A | 4/2002 |
| JP | 3378813 B2 | 2/2003 |
| JP | 3442670 B2 | 9/2003 |
| JP | 3485164 B2 | 1/2004 |
| JP | 2006125186 A | 5/2006 |
| JP | 2008013950 A | 1/2008 |
| JP | 4074420 B2 | 4/2008 |
| JP | 2013072183 A | 4/2013 |
| JP | 2013072224 A | 4/2013 |
| JP | 2015161147 A | 9/2015 |
| JP | 2015180810 A | 10/2015 |
| TW | I246415 B | 1/2006 |
| TW | M305849 U | 2/2007 |
| TW | I463961 B | 12/2014 |
| WO | 2010125951 A1 | 11/2010 |
| WO | 2016009881 A1 | 1/2016 |

* cited by examiner

CONTROL DEVICE OF WINDOW COVERING SYSTEM

CROSS REFERENCE TO RELATED APPLICATION

This application claims priority from China Application Serial No. 201620065142.0 filed Jan. 22, 2016, China Application Serial No. 201620094802.8 filed Jan. 29, 2016, U.S. Provisional Application Ser. No. 62/318,771 filed Apr. 6, 2016, and U.S. Provisional Application Ser. No. 62/326,020 filed Apr. 22, 2016.

FIELD

The present disclosure relates to window covering systems, and more particularly to control devices of the window covering system that allow covering materials to expand at a slow speed and allow springs to be less susceptible to elastic fatigue.

BACKGROUND

A conventional window covering system includes a headrail, a bottom rail, a covering material, and a driving module. The covering material is mounted between the headrail and the bottom rail. The driving module is mounted in the headrail, wherein the driving module can operate with the covering material simultaneously such that the covering material is collected or expanded. The driving module includes a spiral spring, wherein the spiral spring includes a first end and a second end. The spiral spring winds toward the first end or the second end while the covering material is collected or expanded, whereby a restoring force is generated. The restoring force of the spiral spring is less than the weight force from the bottom rail, therefore the bottom rail descends to expand the covering material when a restriction of the bottom rail is removed, thereby achieving light blockage. The bottom rail ascends when an upward force applied by a user and the restoring force from the spiral spring are acting upon the bottom rail, whereby the covering material is collected for removing the light blockage.

However, the covering material is rapidly expanded because of the weight force from the bottom rail when the restriction of the bottom rail is removed, which causes damages to the window covering system due to collision with the surroundings. In addition, the spiral spring winds rapidly with the rapid expansion of the covering material, which results in elastic fatigue of the spiral spring, and thus insufficient restoring force can be provided. Although it is possible to avoid rapid expansion of the covering material and elastic fatigue of the spiral spring by using an operating cord to control an expansion speed of the covering material, using the operating cord is time consuming and inconvenient, therefore the window covering system should be improved. Furthermore, the elastic fatigue of the spiral spring causes undesired descending of the bottom rail after the covering material is collected, such that the covering material can not be completely collected. Some people uses the spiral spring with a larger restoring force to overcome the elastic fatigue problem, but the user must apply a greater downward force to resist the larger restoring force so as to remove the restriction of the bottom rail, thus inconvenience of operation.

SUMMARY

In view of the above, the present disclosure provides a control device for controlling a window covering system and a window covering system having the same.

The control device for reducing an expansion speed of a covering material of the window covering system. The window covering system comprises the control device, the covering material and a weight member attached below the covering material to provide a weight force to the covering material. The control device comprises a driving module comprising a drive member; a spring having two ends, wherein one end is connected to the drive member to provide a restoring force to the drive member to resist the weight force of the weight member, and wherein the restoring force is less than the weight force; a lifting module comprising a winding device configured to operate with the drive member and the covering material simultaneously, wherein the winding device is rotated in a first direction when the covering material is expanded; an unlocking module comprising a rotating member configured to operate with the winding device simultaneously, a locking member configured to lock the rotating member so as to restrict the first direction rotation of the winding device, and a control member configured to drive the locking member to unlock the rotating member so as to allow the winding device to rotate in the first direction; and a damping module configured to operate with the winding device simultaneously in only one direction for providing a damping force to the winding device selectively, wherein the damping force is provided to the winding device for reducing the expansion speed of the covering material when the winding device is rotated in the first direction, and wherein no damping force is provided to the winding device when the winding device is rotated in a second direction opposite to the first direction.

Compared to conventional designs, the control device and the window covering system of the present disclosure may effectively control the expansion of the covering material.

BRIEF DESCRIPTION OF THE DRAWINGS

Implementations of the present technology will now be described, by way of example only, with reference to the attached figures.

DETAILED DESCRIPTION

Figure 1:
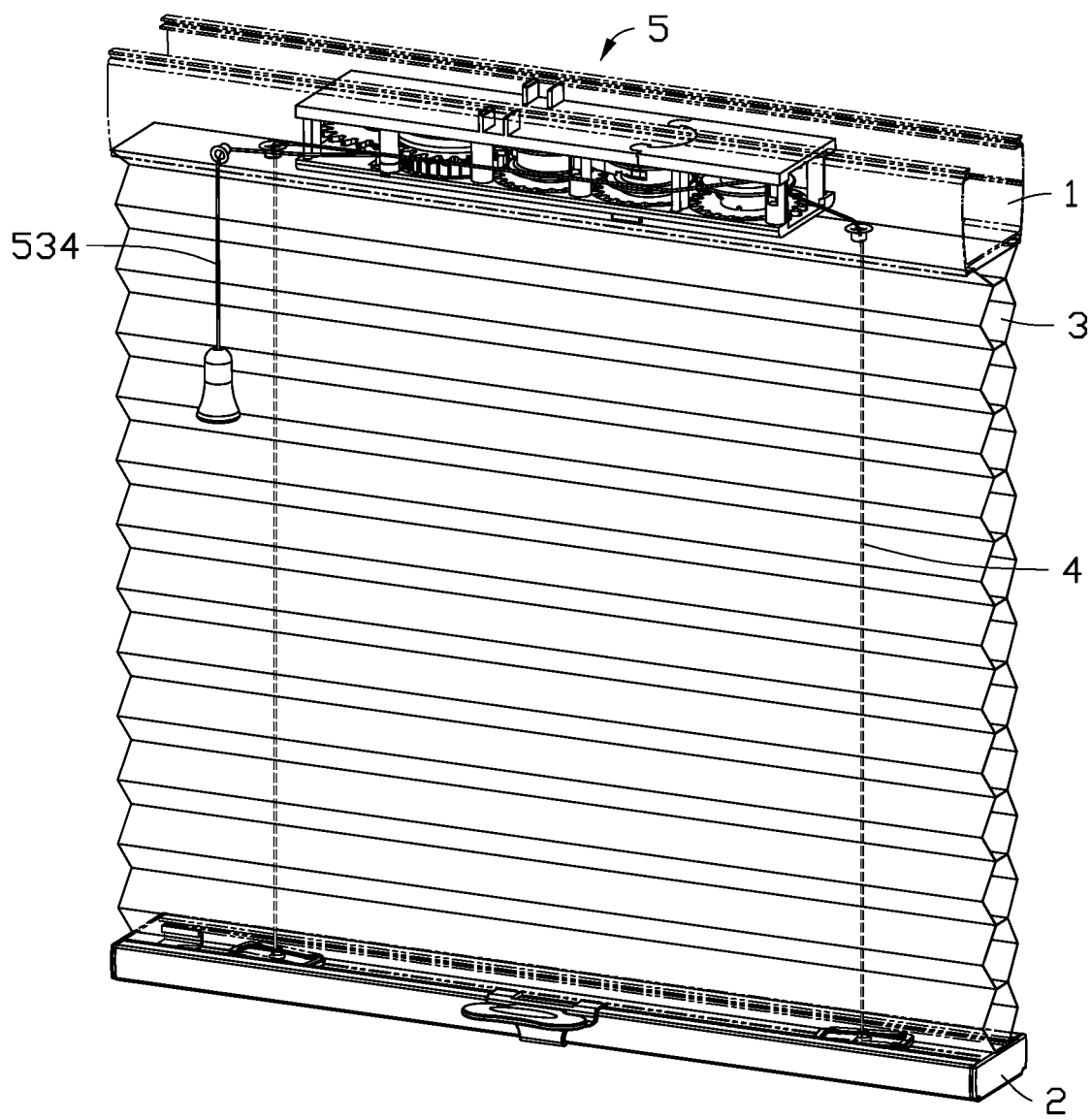
FIG. 1 is a perspective view of a window covering system according to one embodiment of the present disclosure.
Figure 2:
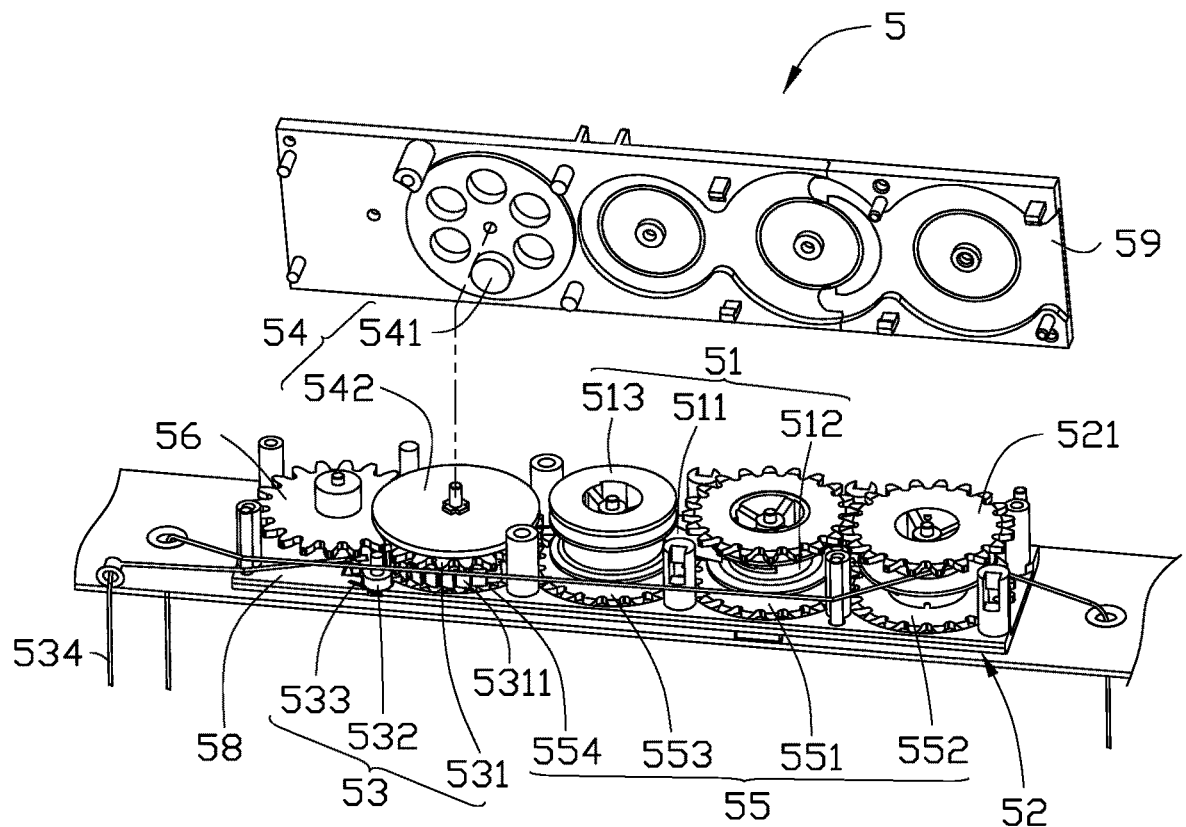
FIG. 2 is an exploded perspective view of a control device in FIG. 1.
Figure 3:
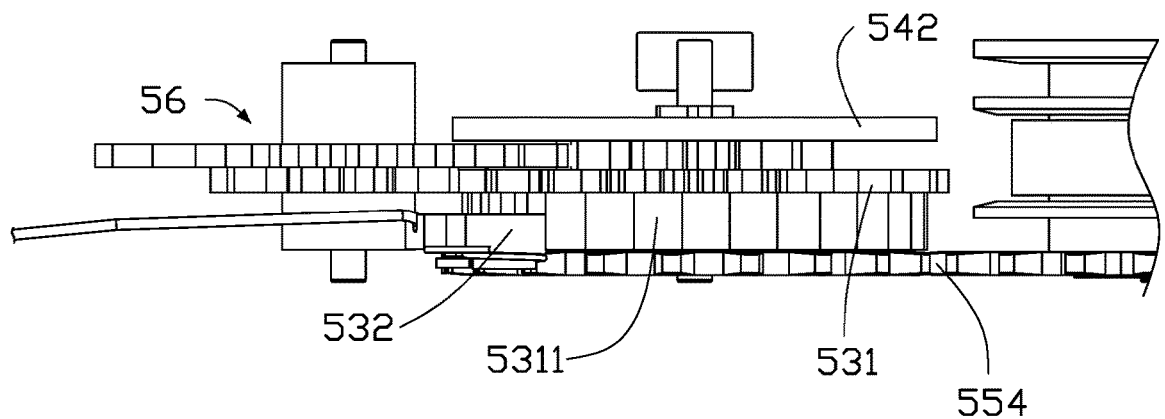
FIG. 3 is a front view of an unlocking module and a damping module of the control device in FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. In addition, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIGS. 1-5 illustrate a control device 5 according to one embodiment of the present disclosure. The control device 5 is used to reduce an expansion speed of a covering material 3 of a window covering system. The window covering system comprises a headrail 1, a weight member, the covering material 3 between the headrail 1 and the weight member, at least one lift cord 4 passing through the covering material 3, and the control device 5, wherein the weight member may be a bottom rail 2 connected below the covering material 3 to provide a weight force to the covering material 3, and the control device 5 is mounted in the headrail 1. One end of the lift cord 4 is secured to the bottom rail 2, and the other end of the lift cord 4 enters into the headrail 1 and connects to the control device 5 after passing through the covering material 3.

In one embodiment of the present disclosure, the control device 5 comprises a driving module 51, a lifting module 52 adjacent to the driving module 51, an unlocking module 53, a damping module adjacent to the unlocking module 53, and a transmission module 55. The driving module 51, the lifting module 52, and the unlocking module 53 are configured to rotate simultaneously through the transmission module 55.

The driving module 51 comprises a first spiral spring 511 with two ends, a drive member 512 and a storage member 513, wherein one end of the first spiral spring 511 is secured to the drive member 512, and the other end of the first spiral spring 511 is secured to the storage member 513. When the covering material 3 is expanding, the first spiral spring 511 provides a pulling force to the drive member 512 to resist the weight force from the bottom rail 2, and the first spiral spring 511 is reverse wound from the storage member 513 to the drive member 512 to store a restoring force. The restoring force of the first spiral spring 511 is less than the weight force of the bottom rail 2. When the covering material 3 is collected, the first spiral spring 511 is rewound from the drive member 512 to the storage member 513 to release the restoring force.

The lifting module 52 comprises at least one winding device 521. The end of the lift cord 4 in the headrail 1 is secured to the winding device 521. When the winding device 521 rotates in a first direction to release the lift cord 4, the covering material 3 is expanded; and when the winding device 521 rotates in a second direction to collect the lift cord 4, the covering material 3 is collected.

The unlocking module 53 comprises a rotating member, a locking member, and a control member, wherein the rotating member is a rotating wheel 531. The rotating wheel 531 comprises gear teeth 5311 on its outer periphery. The locking member is an engaging pawl 532 which is pivotally mounted in the headrail 1 to either engage to the gear teeth 5311 of the rotating wheel 531 or disengage from the gear teeth 5311 of the rotating wheel 531. A resilient member 533 secured to the headrail 1 urges the engaging pawl 532 such that the engaging pawl 532 always engages to the gear teeth 5311 of the rotating wheel 531 when no external force is applied thereto. The control member is a control cord 534 connected to the engaging pawl 532. One end of the control cord 534 is secured to the engaging pawl 532, and the other end of the control cord 534 extends out of the headrail 1 for a user to operate.

The damping module comprises a first damping member and a second damping member corresponding to each other such that the second damping member rotates relative to the first damping member to generate a damping force. In one embodiment of the present disclosure, the damping module may be a magnetic damping module 54. The first damping member is a magnet 541 secured to the headrail 1. The second damping member is positioned corresponding to the magnet 541 and configured to operate simultaneously with the rotating wheel 531, wherein the second damping member is a conductor, such as a metal member, a non-magnetic metal member or an aluminum disc 542. An electromagnetic induction force between the magnet 541 and the aluminum disc 542 generates a damping effect when the aluminum disc 542 is rotated simultaneously with the winding device 521. The electromagnetic induction area and the relative speed between the magnet 541 and the aluminum disc 542 can affect the strength of the electromagnetic induction force. Therefore, the damping effect can be adjusted by varying the electromagnetic induction area between the magnet 541 and the aluminum disc 542, the number of magnets 541, or the rotational speed of the aluminum disc 542. On the contrary, the damping effect is not generated when the aluminum disc 542 is not rotating or is locked. In addition, a speed change module 56 may be provided between the rotating wheel 531 and the aluminum disc 542 by toothed engagement. The rotational speed of the aluminum disc 542 is increased due to different gear ratios in the speed change module 56, thereby enhancing the damping effect.

Figure 4:
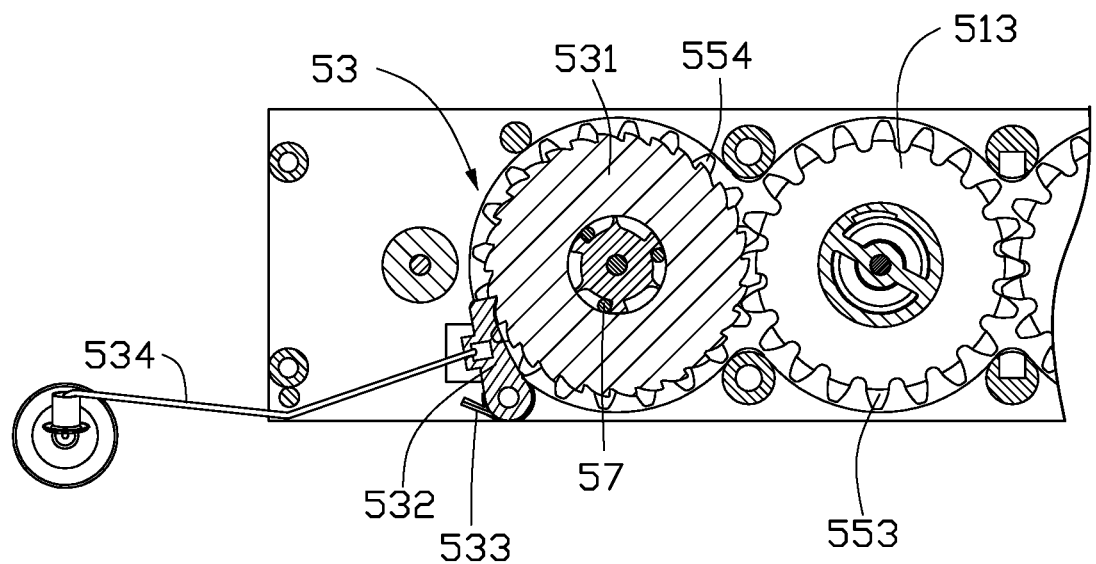
FIG. 4 is a cross-sectional top view of the unlocking module of the control device in FIG. 1 shown in a locked condition.
Figure 5:
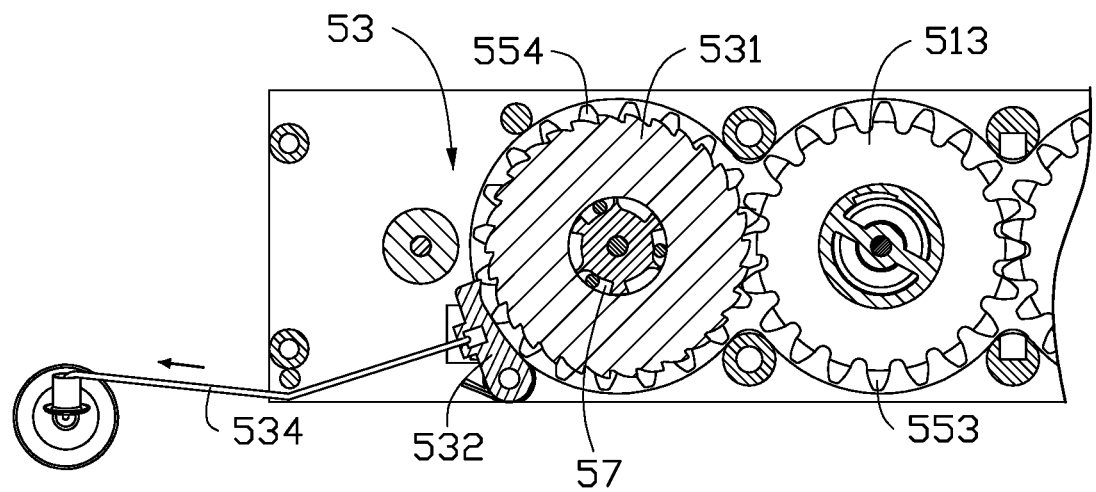
FIG. 5 is a cross-sectional top view of the unlocking module of the control device in FIG. 1 shown in an unlocked condition.
Figure 6:
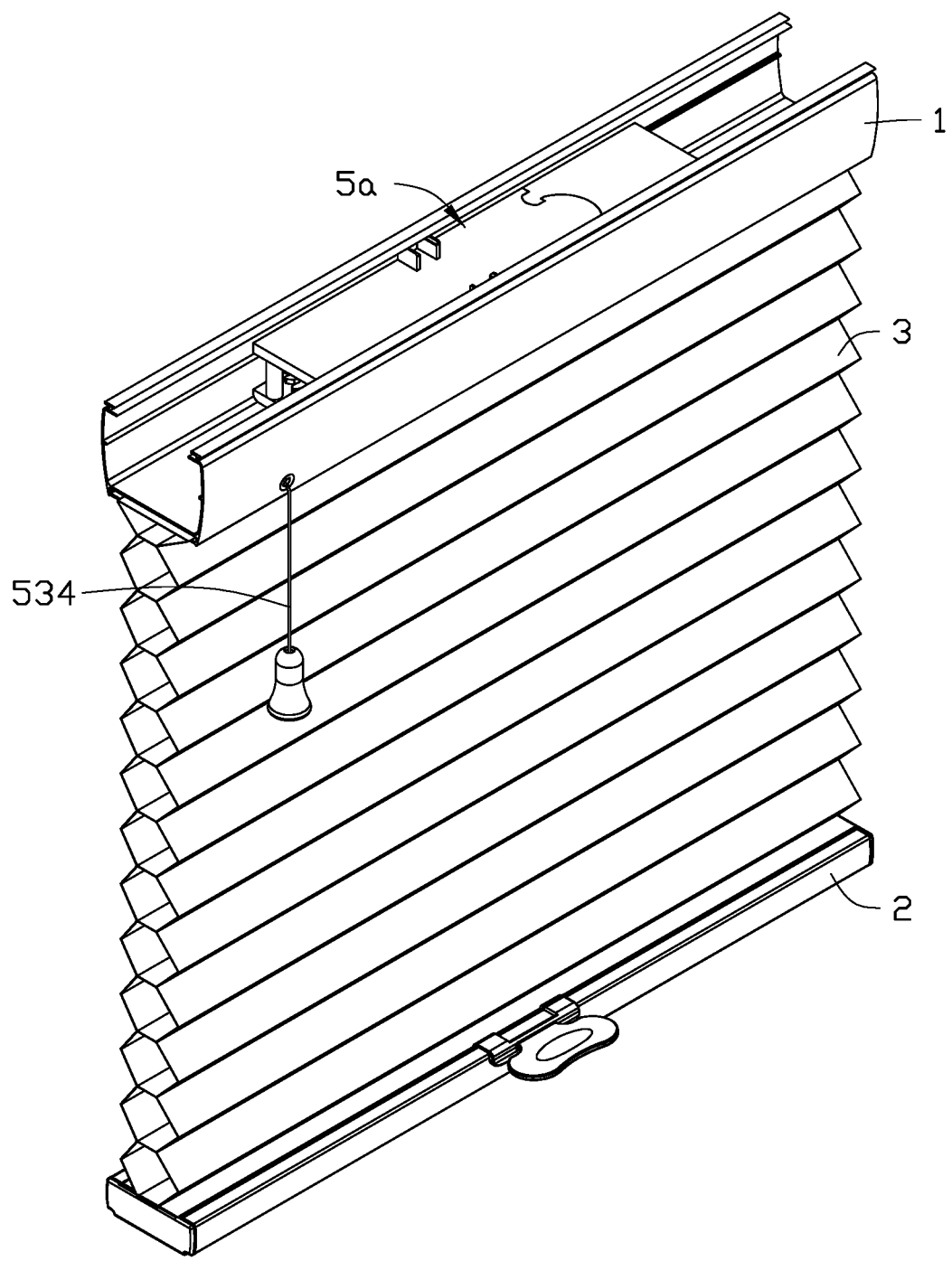
FIG. 6 is a perspective view of a window covering system according to another embodiment of the present disclosure.
Figure 7:
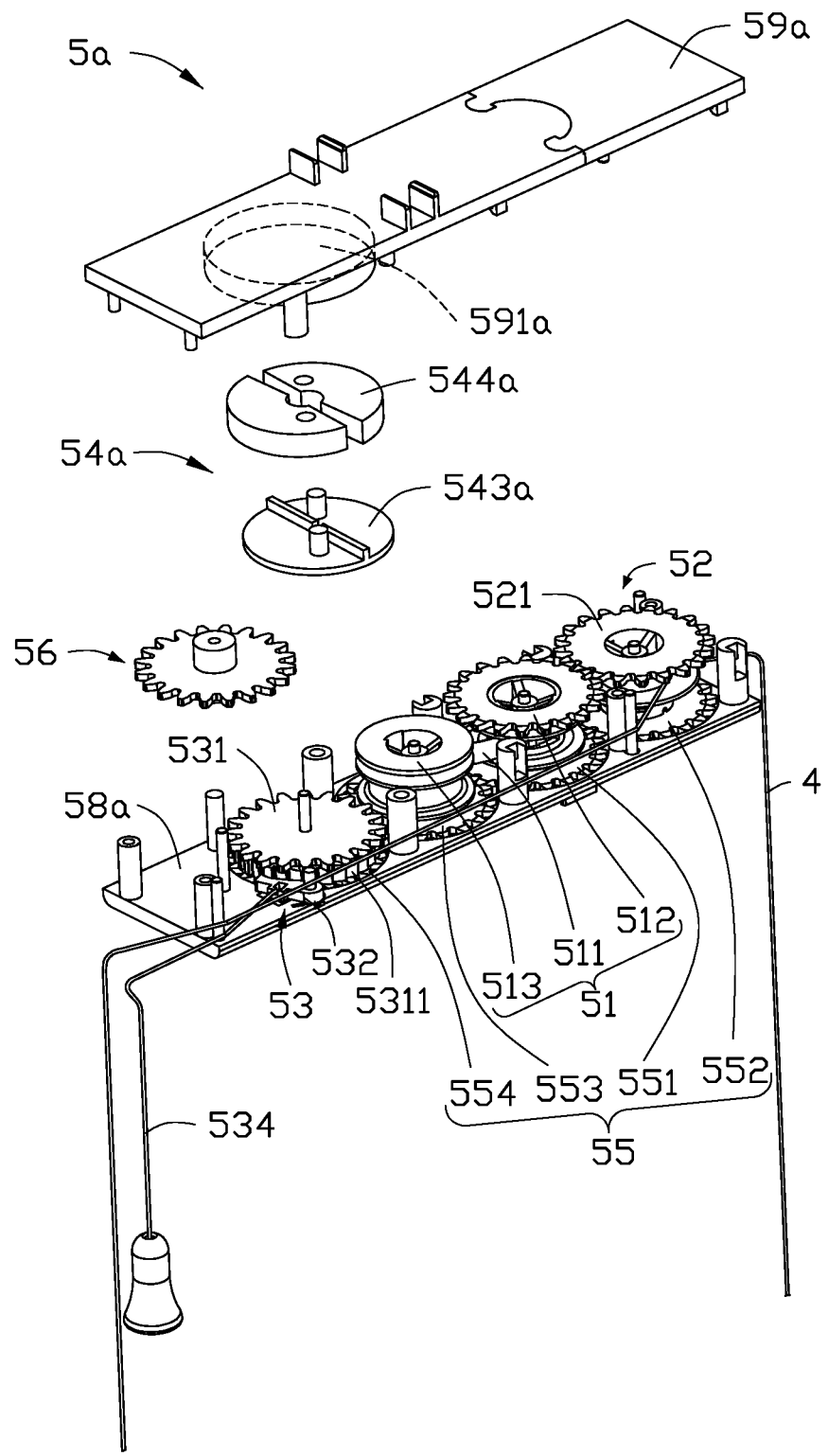
FIG. 7 is an exploded perspective view of a control device in FIG. 6.
Figure 8:
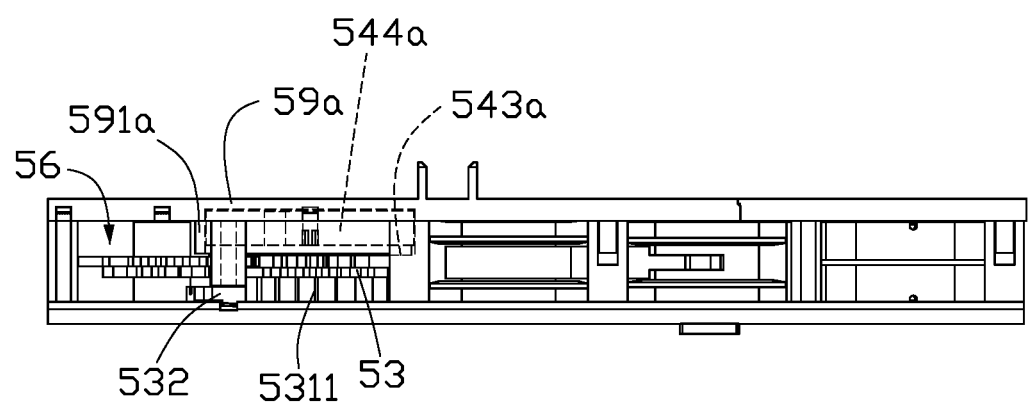
FIG. 8 is a front view of the control device in FIG. 6.
Figure 9:
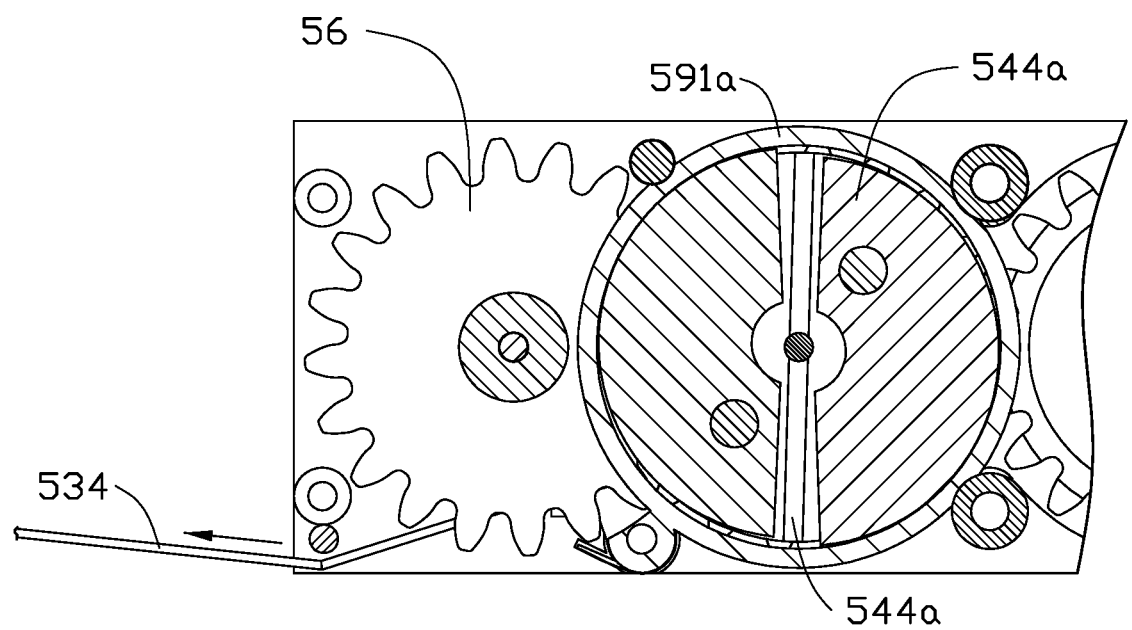
FIG. 9 is a cross-sectional top view of a damping module of the control device in FIG. 6.

The transmission module 55 comprises a first transmission wheel 551, a second transmission wheel 552, a third transmission wheel 553, and a fourth transmission wheel 554. The first transmission wheel 551 is connected below the drive member 512 and is rotated simultaneously with the drive member 512. The second transmission wheel 552 is connected below the winding device 521 and is rotated simultaneously with the winding device 521. The third transmission wheel 553 is connected below the storage member 513 but is not rotated with the storage member 513. The fourth transmission wheel 554 is connected below the rotating wheel 531, and a one-way clutch module 57 is provided in between (as shown in FIG. 4) such that the fourth transmission wheel 554 is rotated with the rotating wheel 531 in only one direction. The rotating wheel 531 is engaged to the fourth transmission wheel 554 through the one-way clutch module 57 when the rotating wheel 531 and the fourth transmission wheel 554 are rotating for expanding the covering material 3, such that the drive member 512, the winding device 521, and the rotating wheel 531 rotates simultaneously. The rotating wheel 531 is disengaged from the fourth transmission wheel 554 through the one-way clutch module 57 when the fourth transmission wheel 554 is rotating for collecting the covering material 3, such that the rotating wheel 531 is not rotating with the drive member 512 and the winding device 521.

The control device 5 may further comprise a base 58 and a top cover 59 according to one embodiment of the present disclosure. The components of foregoing embodiments described above can be assembled on the base 58, and the top cover 59 is then covered thereon such that the control device 5 can be manufactured as a single modular device which can be easily mounted in the headrail 1. A bottom surface of the top cover 59 may be used to secure the magnet 541 of the magnetic damping module 54.

When the drive member 512 rotates, the first transmission wheel 551 connected to the drive member 512 is rotated to rotate the second transmission wheel 552, whereby the third transmission wheel 553 is rotated, and thus rotating the fourth transmission wheel 554, such that the winding device 521 and the rotating wheel 531 are rotated together. The rotating wheel 531 is locked from rotation when the engaging pawl 532 is engaged to the gear teeth 5311 of the rotating wheel 531, such that the drive member 512 and the winding device 521 are also locked from rotation through the transmission module 55.

When the covering material 3 is completely collected, the engaging pawl 532 is engaged to the gear teeth 5311 of the rotating wheel 531 to lock the rotating wheel 531 from rotation in order to prevent the covering material 3 from expanding by the weight force of the bottom rail 2. The weight force causes the fourth transmission wheel 554 to engage the rotating wheel 531 through the one-way clutch module 57, such that the drive member 512 and the winding device 521 are also locked from rotation through the transmission module 55. Therefore, the first direction rotation of the winding device 521 is restricted, and the covering material 3 is held in the collected state.

When the control cord 534 is operated to expand the covering material 3, the engaging pawl 532 is pivoted by the control cord 534 to disengage from the gear teeth 5311 of the rotating wheel 531 so as to unlock the rotating wheel 531. Thus, the drive member 512 and the winding device 521 are also unlocked through the transmission module 55. At this time, the bottom rail 2 descends because the weight force of the bottom rail 2 is greater than the restoring force of the first spiral spring 511, hence the winding device 521 rotates in the first direction to release the lift cord 4 for expanding the covering material 3. In addition, rotation of the winding device 521 drives the drive member 512 to rotate such that the first spiral spring 511 is reverse wound from the storage member 513 to the drive member 512 to store the restoring force.

During the expansion of the covering material 3, the rotating wheel 531 is engaged to the fourth transmission wheel 554 of the transmission module 55 through the one-way clutch module 57 such that rotation of the rotating wheel 531 drives the speed change module 56 and the aluminum disc 542 of the magnetic damping module 54 to rotate. Thus, the aluminum disc 542 is rotated relative to the magnet 541 secured to the headrail 1 to generate the damping force so as to reduce the rotational speed of the aluminum disc 542. Thus, the rotational speed of the rotating wheel 531, the transmission module 55, the drive member 512, and the winding device 521 are also reduced. Therefore, the release speed of the lift cord 4 and the expansion speed of the covering material 3 are reduced.

When the bottom rail 2 is pushed upward by a user for collecting the covering material 3, the first spiral spring 511 is rewound from the drive member 512 to the storage member 513 to rotate the drive member 512 such that the transmission module 55 is rotated to drive the winding device 521 rotating in the second direction for collecting the lift cord 4 and the covering material 3.

When the fourth transmission wheel 554 is rotating during the collection of the covering material 3, the rotating wheel 531 is disengaged from the fourth transmission wheel 554 through the one-way clutch module 57 such that the rotating wheel 531 does not rotate with the transmission module 55, and thus the aluminum disc 542 of the magnetic damping module 54 is not rotated. Therefore, no damping effect is generated by the magnetic damping module 54.

The damping module allows the covering material 3 to expand at a slow speed. Therefore, the problems that the window covering system is damaged due to rapid expansion of the covering material 3 and potential elastic fatigue of the first spiral spring 511 are avoided. Furthermore, undesired descending of the bottom rail 2 does not occur when the covering material 3 is collected.

FIGS. 6-9 illustrate a control device 5a according to one embodiment of the present disclosure. The control device 5a comprises the driving module 51, the lifting module 52, the unlocking module 53, a damping module, and the transmission module 55. The driving module 51, the lifting module 52, the unlocking module 53, and the transmission module 55 are the same as the foregoing, but not limited thereto. The damping module is a friction damping module 54a which comprises a first damping member and a second damping member, wherein the second damping member is a plate 543a with at least one friction block 544a pivotally mounted thereon, and the plate 543a can rotate simultaneously with the rotating wheel 531. The first damping member has a recess 591a arranged corresponding to the plate 543a in the headrail 1 for receiving the friction block 544a.

In one embodiment of the present disclosure, the control device 5a may further comprise a base 58a and a top cover 59a. The components of foregoing embodiments described above can be assembled on the base 58a, and the top cover 59a is then covered thereon such that the control device 5a can be manufactured as a single modular device which can be easily mounted in the headrail 1. The recess 591a can be defined at a bottom surface of the top cover 59a corresponding to the plate 543a for receiving the friction block 544a.

When the rotating wheel 531 is rotated to rotate the plate 543a, the friction block 544a pivotally mounted to the plate 543a is pivoted outwardly by a centrifugal force about a pivot axis, and the friction block 544a rubs an inner wall of the recess 591a to generate a friction force, and thus damping effect is generated so as to reduce the rotational speed of the plate 543a, whereby reducing the rotational speed of the rotating wheel 531. Therefore, the release speed of the lift cord 4 and the expansion speed of the covering material 3 are reduced. The friction force can be adjusted by varying the rotational speed of the plate 543a or varying the contact area between the friction block 544a and the inner wall of the recess 591a, for example, by increasing the number of the friction block 544a to increase the contact area. In addition, a speed change module 56 may be connected between the rotating wheel 531 and the plate 543a by toothed engagement. The rotational speed of the plate 543a is increased by different gear ratios in the speed change module 56, thereby enhancing the damping effect.

The control member 534 is operated to cause the engaging pawl 532 to pivot and disengage from the gear teeth 5311 of the rotating wheel 531 so as to unlock the rotating wheel 531, whereby the drive member 512 and the winding device 521 are also unlocked through the transmission module 55. Under this condition, the winding device 521 can rotate in the first direction to release the lift cord 4, whereby the covering material 3 is expanded. During the expansion of the covering material 3, the rotating wheel 531 is rotated to drive the speed change module 56 and the plate 543a to rotate, therefore the friction block 544a pivotally mounted to the plate 543a pivots and rubs the inner wall of the recess 591a to provide the friction force so as to reduce the rotational speed of the plate 543a, the rotating wheel 531, and the winding device 521. Therefore, the release speed of the lift cord 4 and the expansion speed of the covering material 3 are reduced.

Figure 10:
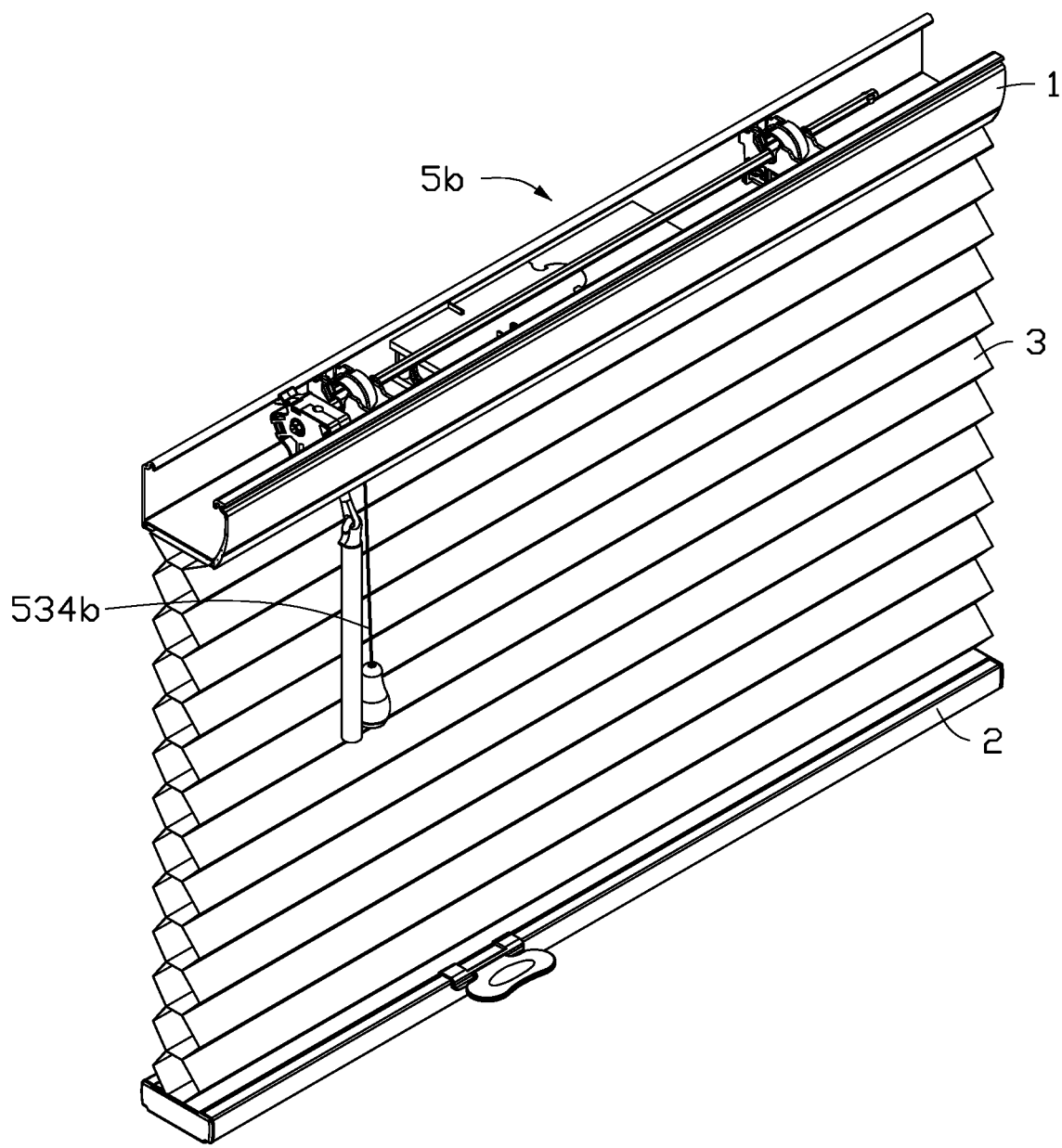
FIG. 10 is a perspective view of a window covering system according to another embodiment of the present disclosure.
Figure 11:
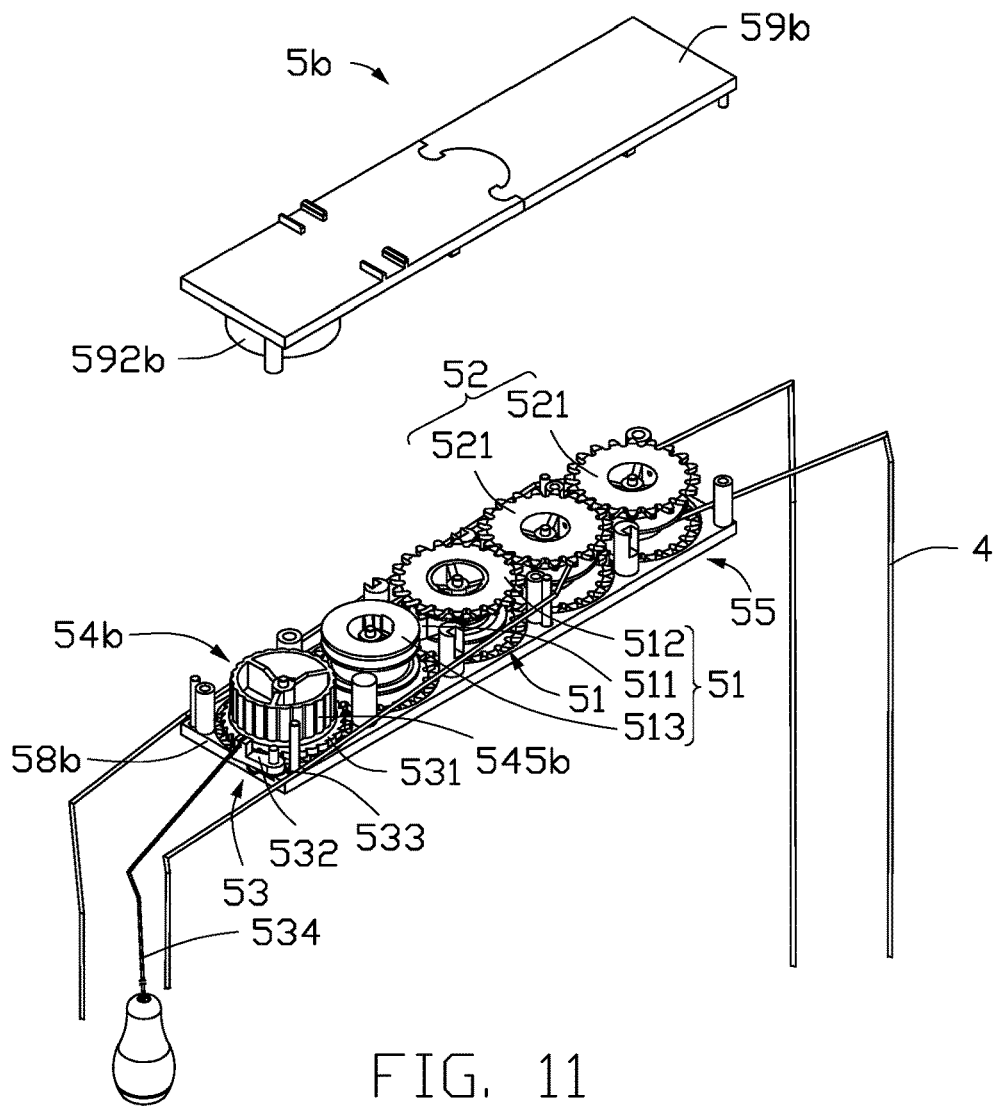
FIG. 11 is an exploded perspective view of a control device in FIG. 10.
Figure 12:
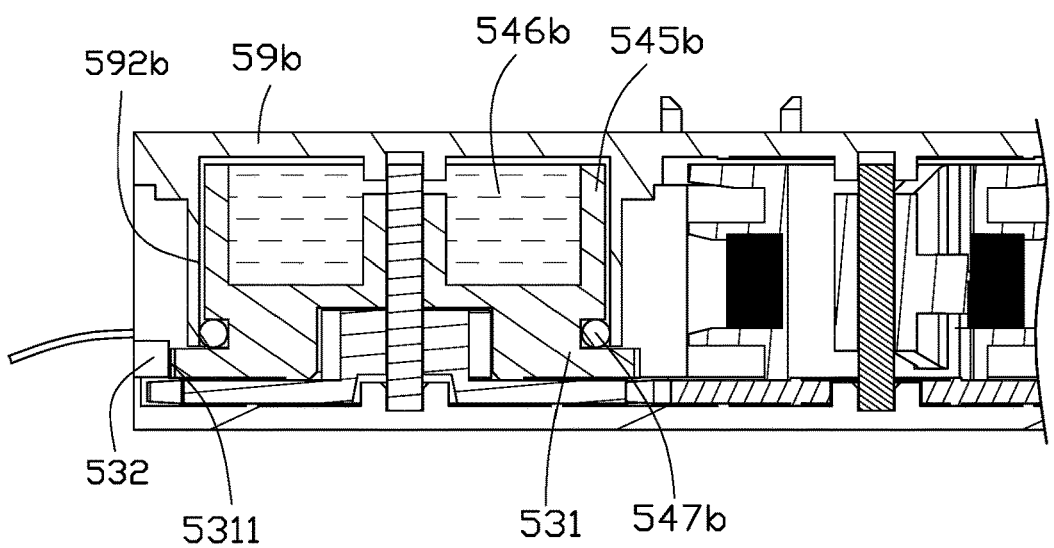
FIG. 12 is a cross-sectional front view of a damping module of the control device in FIG. 10.
Figure 13:
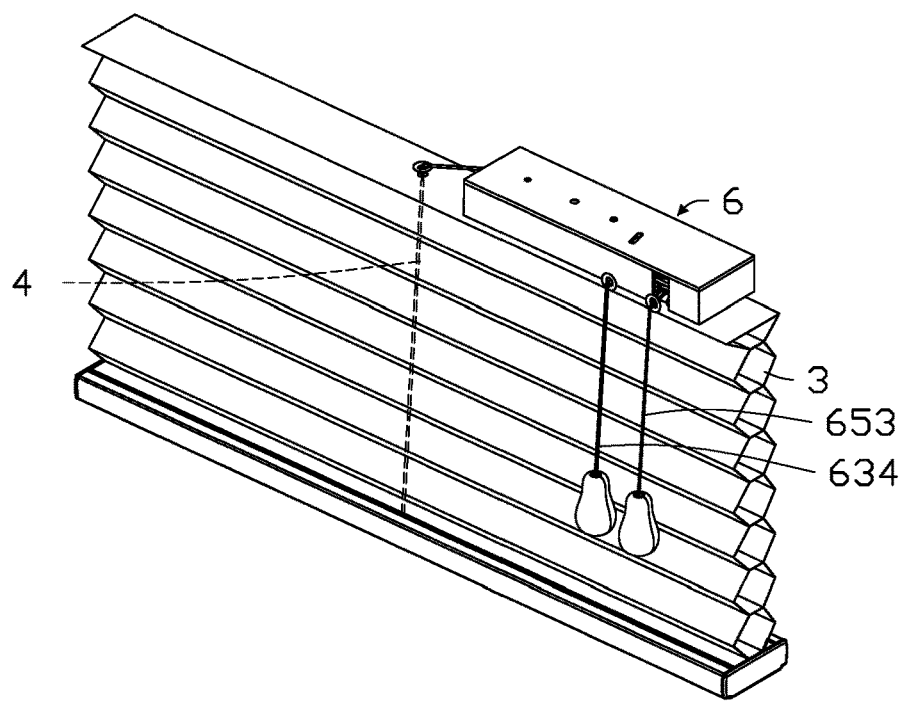
FIG. 13 is a perspective view of a window covering system according to another embodiment of the present disclosure.
Figure 14:
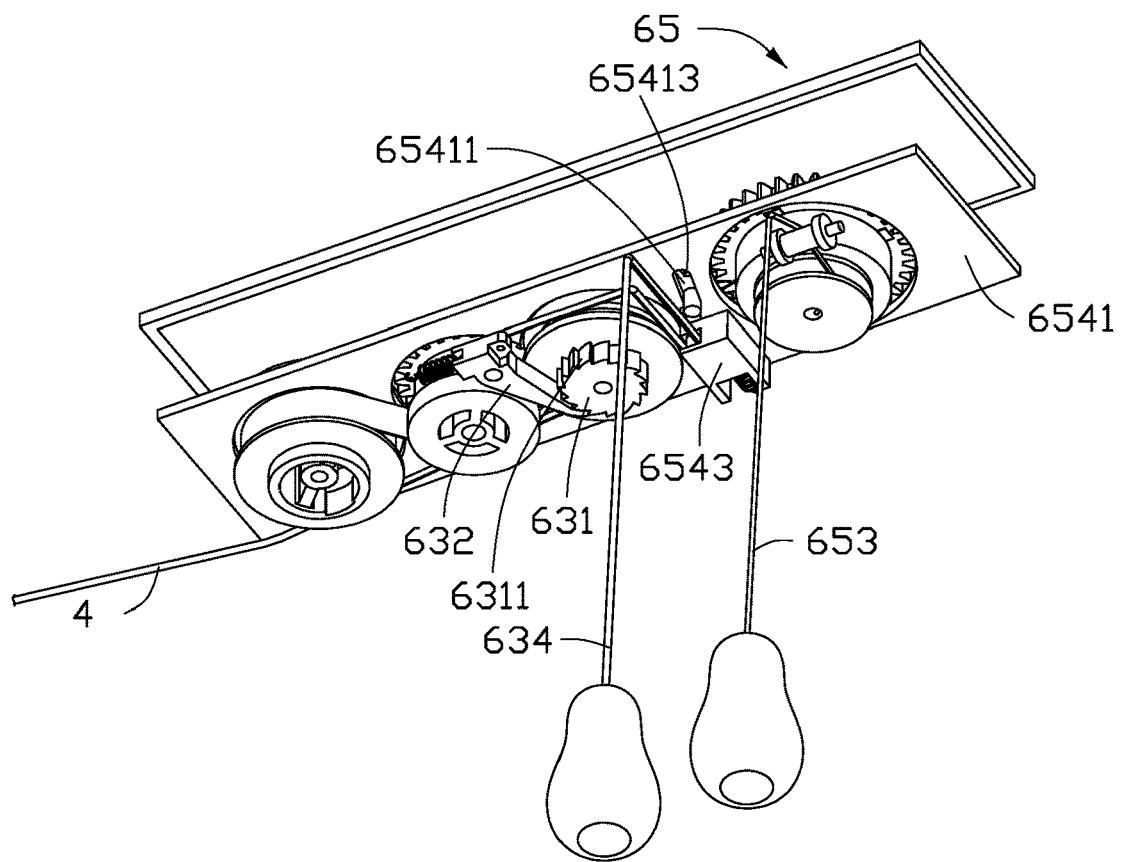
FIG. 14 is a perspective view of a control device in FIG. 13.
Figure 15:
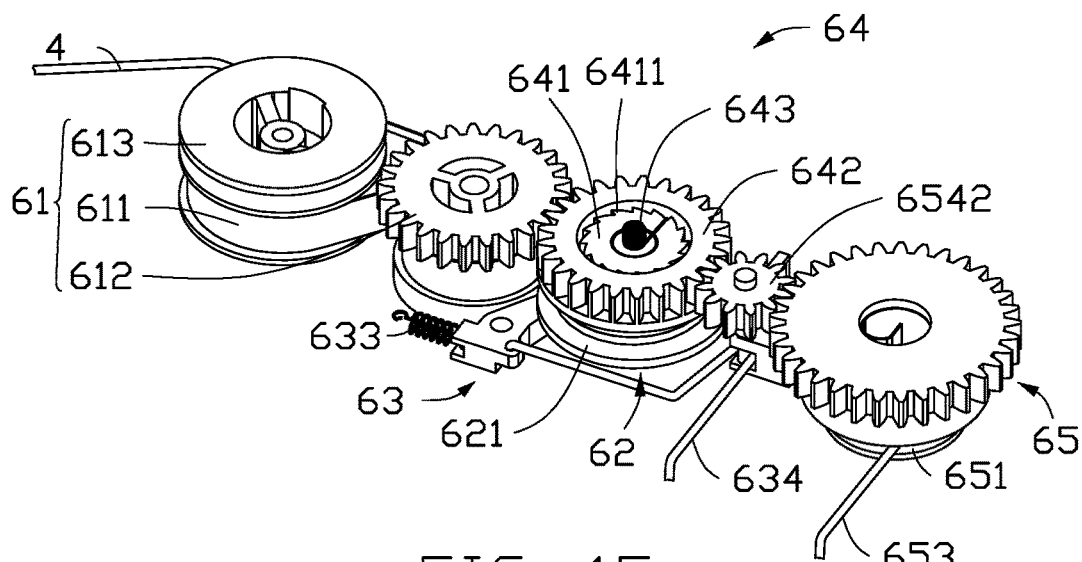
FIG. 15 is a partial perspective view of the control device in FIG. 13.
Figure 16:
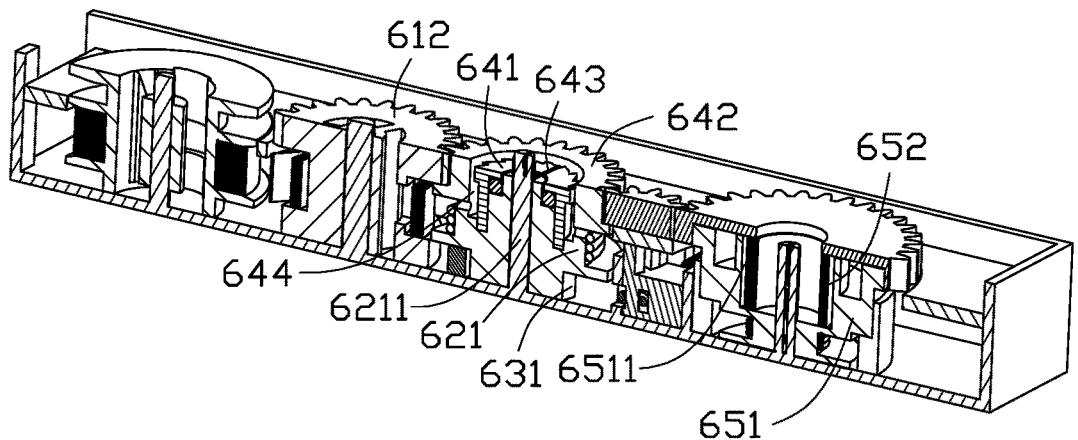
FIG. 16 is a cross-sectional perspective view of the control device in FIG. 13.
Figure 17:
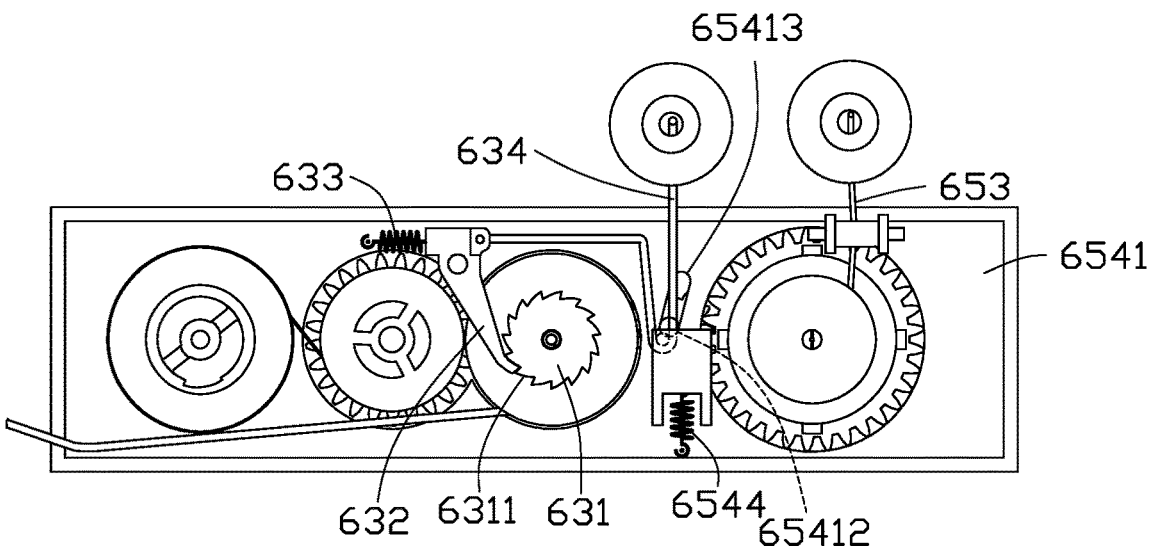
FIG. 17 is a bottom view of the control device in FIG. 13 shown in a locked condition.
Figure 18:
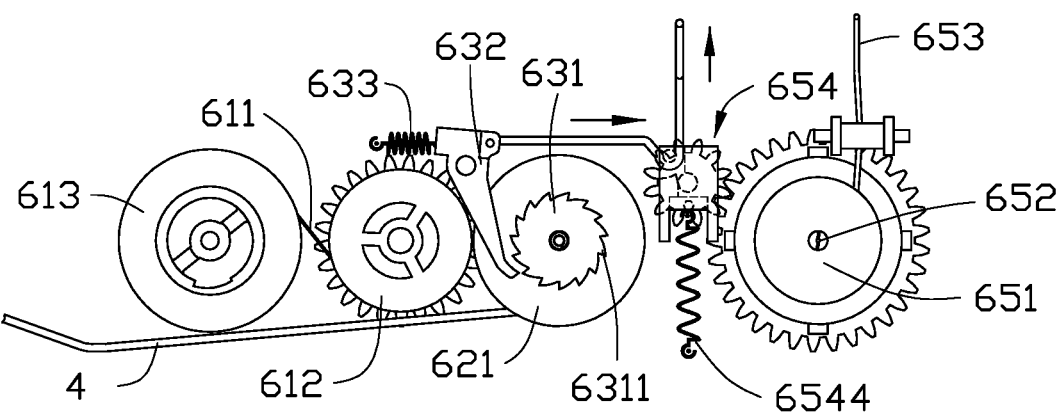
FIG. 18 is a bottom view of the control device in FIG. 13 shown in an unlocked condition.
Figure 19:
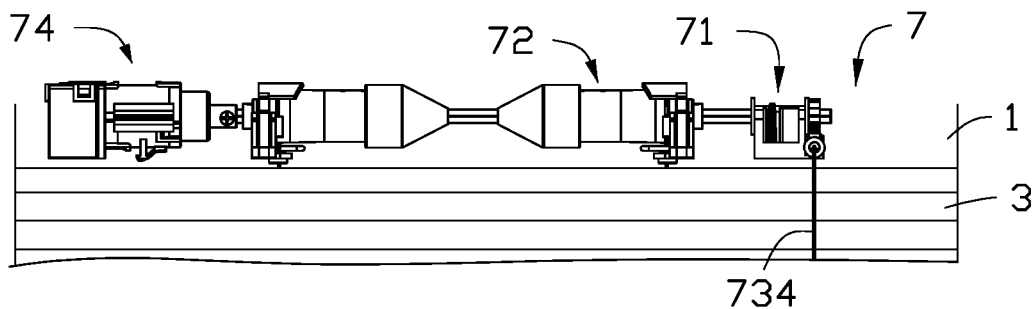
FIG. 19 is a front view of a control device according to one embodiment of the present disclosure.
Figure 20:
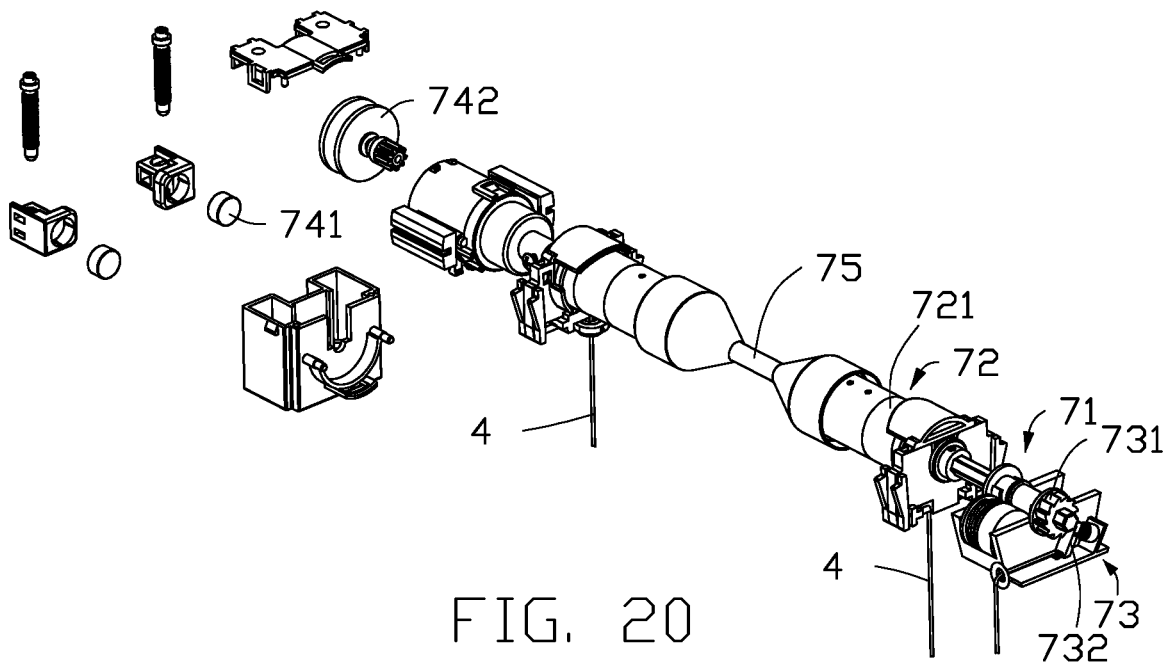
FIG. 20 is an exploded perspective view of a control device in FIG. 19.
Figure 21:
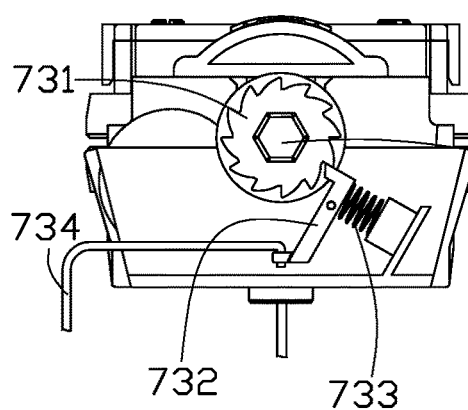
FIG. 21 is a side view of the control device in FIG. 19.
Figure 22:
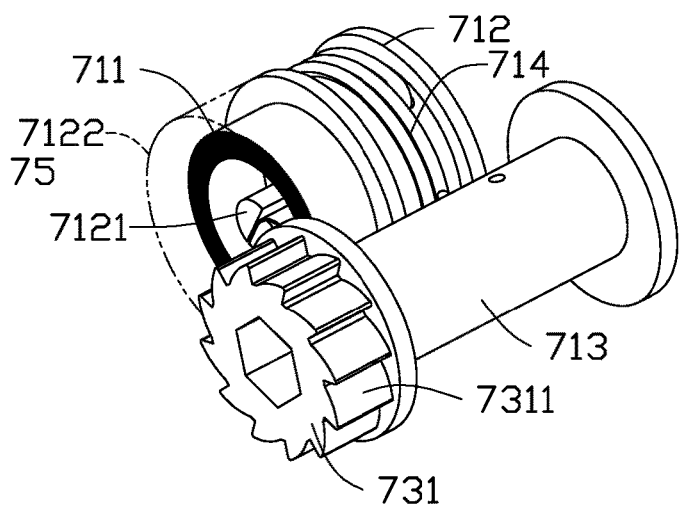
FIG. 22 is a perspective view of a driving module of the control device in FIG. 19.
Figure 23:
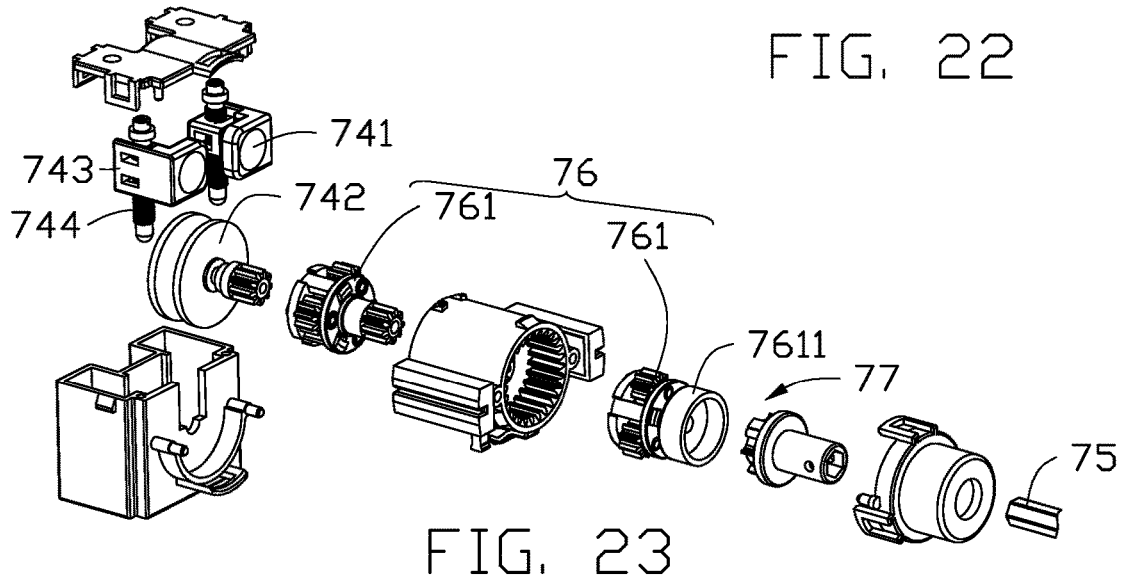
FIG. 23 is an exploded perspective view of a damping module of the control device in FIG. 19.
Figure 24:
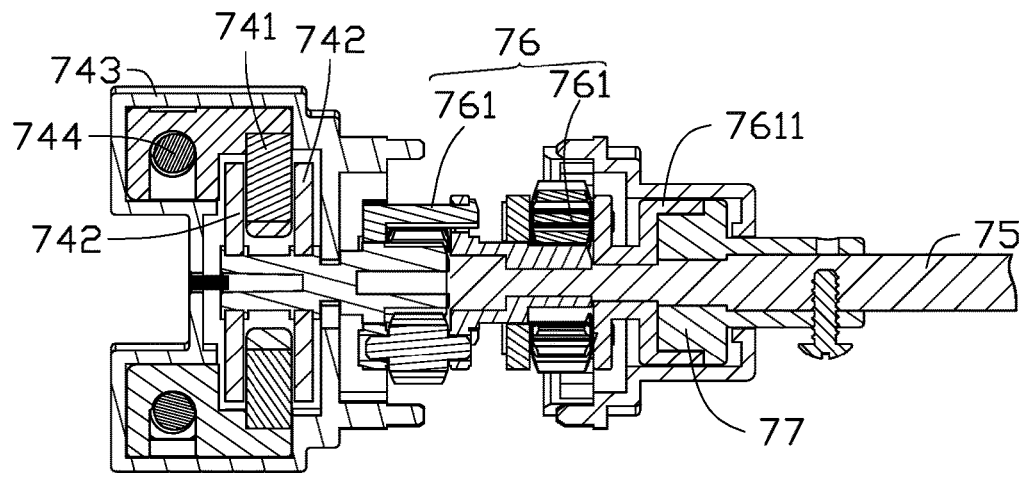
FIG. 24 is a cross-sectional front view of the damping module of the control device in FIG. 19.

FIGS. 10-12 illustrate a control device 5b according to one embodiment of the present disclosure. The control device 5b comprises the driving module 51, the lifting module 52, the unlocking module 53, a damping module, and the transmission module 55. The driving module 51, the lifting module 52, the unlocking module 53, and the transmission module 55 are the same as the foregoing, but not limited thereto. The damping module is an oil damping module 54b which comprises a first damping member and a second damping member. The second damping member is a disturbing member 545b secured to or integrated formed on top of the rotating wheel 531 in the headrail 1. The first damping member is a housing 592b arranged corresponding to the rotating wheel 531 such that the disturbing member 545b and a fluid are disposed within the housing 592b, wherein the fluid may be air, water, damping oil, or high viscosity fluid. In one embodiment of the present disclosure, the fluid is a damping oil 546b as shown in FIG. 12.

In one embodiment of the present disclosure, the control device 5b may further comprise a base 58b and a top cover 59b. The components of foregoing embodiments described above can be assembled on the base 58b, and the top cover 59b is then covered thereon such that the control device 5b can be manufactured as a single modular device which can be easily mounted in the headrail 1. The housing 592b may be formed on a bottom surface of the top cover 59b to correspond to the rotating wheel 531 and to receive the disturbing member 545b and the damping oil 546b. A sealing ring 547b is provided between the housing 592b and the rotating wheel 531.

When the rotating wheel 531 and the disturbing member 545b rotate simultaneously relative to the housing 592b which is secured to be stationary, the rotation of the disturbing member 545b in the damping oil 546b is resisted by the damping oil 546b due to viscosity of the damping oil 546*b*, whereby the damping force is generated such that reduces the rotational speed of the disturbing member 545*b*. Thus, the rotational speed of the rotating wheel 531 which is rotating with the disturbing member 545*b* is reduced, whereby the damping effect is generated. Therefore, the expansion speed of the covering material 3 is reduced. The damping force can be adjusted by varying the rotational speed of the disturbing member 545*b* or varying the viscosity of the damping oil 546*b*. In addition, a speed change module (not shown) may be provided between the rotating wheel 531 and the disturbing member 545*b* to increase the rotational speed of the disturbing member 545*b*, thereby enhancing the damping effect.

The control member 534 is pulled to cause the engaging pawl 532 to pivot and disengage from the gear teeth 5311 of the rotating wheel 531 so as to unlock the rotating wheel 531, the drive member 512, and the winding device 521. Under this condition, the winding device 521 can rotate in the first direction to release the lift cord 4, and the covering material 3 is expanded. During the expansion of the covering material 3, the rotating wheel 531 is rotated to rotate the disturbing member 545*b*, wherein the rotation of the disturbing member 545*b* in the damping oil 546*b* is resisted by the damping oil 546*b* to generate a damping force so as to reduce the rotational speed of the disturbing member 545*b*, the rotating wheel 531, the drive member 512, and the winding device 521. Therefore, the release speed of the lift cord 4 is reduced, as well as the expansion speed of the covering material 3 is reduced.

FIGS. 13-18 illustrate a control device 6 according to one embodiment of the present disclosure. The control device 6 comprises a driving module 61, a lifting module 62, an unlocking module 63, a damping module 64, and an operating cord module 65.

The driving module 61 comprises a first spiral spring 611, a drive member 612 and a storage member 613. The first spiral spring 611 comprises two ends. One end of the first spiral spring 611 is secured to the drive member 612, and the other end of the first spiral spring 611 is secured to the storage member 613. When the covering material 3 is expanding, the first spiral spring 611 provides a pulling force to the drive member 612 to resist the weight force from the bottom rail 2, and the first spiral spring is reverse wound from the storage member 613 to the drive member 612 to store a restoring force.

The lifting module 62 comprises a winding device 621. The end of the lift cord 4 in the headrail 1 is secured to the winding device 621. When the winding device 621 rotates in a first direction to release the lift cord 4, the covering material 3 is expanded; and when the winding device 621 rotates in a second direction to collect the lift cord 4, the covering material 3 is collected.

The unlocking module 63 comprises a rotating member, a locking member, and a control member. The rotating member is a rotating wheel 631 secured to or integrally formed at bottom of the winding device 621, wherein the rotating wheel 631 can rotate simultaneously with the winding device 621. The rotating wheel 631 comprises ratchet teeth 6311 on its outer periphery. The locking member is an engaging pawl 632 which is pivotally mounted in the headrail 1 to either engage to the ratchet teeth 6311 of the rotating wheel 631 or to disengage from the ratchet teeth 6311 of the rotating wheel 631. When the rotating wheel 631 is about to rotate to be driven by the winding device 621, the ratchet teeth 6311 is abutted by the engaging pawl 632 such that the rotating wheel 631 and the winding device 621 are prohibited from rotating in the first direction; and when the winding device 621 rotates in the second direction, the ratchet teeth 6311 can slide over the engaging pawl 632. A resilient member 633 secured to the headrail 1 urges the engaging pawl 632 to always engage to the ratchet teeth 6311 of the rotating wheel 631 when no external force is acting upon the engaging pawl 632. The control member is a control cord 634 with two ends, wherein one end of the control cord 634 is secured to the engaging pawl 632, and the other end of the control cord 634 extends out of the headrail 1 for the user to operate.

The damping module 64 comprises a first damping member and a second damping member disposed corresponding to each other such that the second damping member is rotated relative to the first damping member to generate a damping force. In one embodiment of the present disclosure, the first damping member is a ratchet wheel 641 having ratchet teeth 6411, and the second damping member is a casing 642 secured to or integrally formed at one surface of the winding device 621, wherein the casing 642 can rotate simultaneously with the winding device 621, and the ratchet wheel 641 is coaxially disposed in the casing 642. A fluid is filled between the casing 642 and the ratchet wheel 641, wherein the fluid may be air, water, damping oil, or high viscosity fluid. In one embodiment of the present disclosure, the fluid is a damping oil 644.

A torsion spring 643 has two ends, wherein one end is mounted to a spindle 6211 of the winding device 621, and the other end is secured to the headrail 1. The ratchet teeth 6411 of the ratchet wheel 641 is engaged by the torsion spring 643, such that the ratchet wheel 641 can only rotate in one direction. The ratchet wheel 641 is able to rotate in the second direction with the winding device 621, but is not able to rotate in the first direction with the winding device 621. When the winding device 621 and the casing 642 are rotated in the first direction, the casing 642 rotates relative to the ratchet wheel 641 such that the ratchet wheel 641 remains stationary due to restriction from the torsion spring 643. Thus, the rotation of the casing 642 is resisted by the damping oil 644 to generate the damping force so as to reduce the rotational speed of the casing 642 and the winding device 621. When the winding device 621 and the casing 642 are rotated in the second direction, the ratchet teeth 6411 of the ratchet wheel 641 slides through the torsion spring 643, therefore the ratchet wheel 641 rotates simultaneously with the winding device 621 and the casing 642 such that no damping force is generated.

In one embodiment of the present disclosure, the casing 642 of the damping module 64, the rotating wheel 631 of the unlocking module 63, and the winding device 621 of the lifting module 62 are integrally formed together, and the casing 642 engages to the drive member 612 by toothed engagement. Therefore, the casing 642, the winding device 621, and the drive member 612 are locked when the engaging pawl 632 engages to the rotating wheel 631 to lock the driving wheel 631; and the casing 642, the winding device 621, and the drive member 612 are unlocked when the engaging pawl 632 is disengaged from the rotating wheel 631 to unlock the rotating wheel 631.

In one embodiment of the present disclosure, the operating cord module 65, which has retractable function, comprises a reel 651, a second spiral spring 652, an operating cord 653, and a clutch gear assembly 654. The reel 651 comprises a chamber 6511. The second spiral spring 652 having two ends is disposed in the chamber 6511, wherein one end of the second spiral spring 652 is secured to an inner wall of the chamber 6511, and the other of the second spiral spring 652 is secured to a spindle of the chamber 6511.

When the reel 651 is driven to rotate, the second spiral spring 652 can reverse wind within the chamber 6511 to store an energy; when the reel 651 is stopped from rotation, the second spiral spring 652 can rewind to release the energy to rotate the reel 651. One end of the operating cord 653 is secured to the reel 651, and the other end of the operating cord 653 is provided for the user to operate to rotate the reel 651, wherein the operating cord 653 is wound or unwound about the reel 651 together with the second spiral spring 652. When the user pulls the operating cord 653 to rotate the reel 651, the second spiral spring 652 reverse wind within the chamber 6511 to store the energy, as well as the operating cord 653 is unwound by the reel 651; when the user let go of the operating cord 653, the energy is released by the second spiral spring 652 to rotate the reel 651 such that the operating cord 653 is wound back onto the reel 651.

The clutch gear assembly 654 is provided between the reel 651 and the casing 642 of the damping module 64. The clutch gear assembly 654 comprises a mounting board 6541 mounted to the headrail 1, a clutch gear 6542, a carriage 6543, and a tension spring 6544, wherein the mounting board 6541 comprises a guide slot 65411. The guide slot 65411 comprises an engaged end 65412 and a disengaged end 65413. The clutch gear 6542 is positioned within the guide slot 65411 to move along the guide slot 65411, wherein the clutch gear 6542 is always engaged to the reel 651 by toothed engagement. When the reel 651 is rotated to unwind the operating cord 653, the clutch gear 6542 is rotated to move along the guide slot 65411 to the engaged end 65412 such that the clutch gear 6542 is engaged between the reel 651 and the casing 642 by toothed engagement, and thus the reel 651 can rotate simultaneously with the casing 642. When the reel 651 is rotated to collect the operating cord 653, the clutch gear 6542 is rotated to move along the guide slot 65411 to the disengaged end 65413 such that the clutch gear 6542 is disengaged from the casing 642, and thus the casing 642 and the reel 651 do not rotate simultaneously. The carriage 6543 is urged by the tension spring 6544 secured to the headrail 1 such that the carriage 6543 is adjacent to the engaged end 65412, wherein the carriage 6543 can be pulled by the control cord 634 to move and push the clutch gear 6542 along the guide slot 65411 from the engaged end 65412 to the disengaged end 65413.

When the covering material 3 is stationary, the engaging pawl 632 is engaged to the ratchet teeth 6311 of the rotating wheel 631 to lock the rotating wheel 631 from rotating with the winding device 621 such that resisting against the weight force of the bottom rail 2 that urges the winding device 621 to rotate in the first direction, and thus the winding device 621, the casing 642, and the drive member 612 are also locked from rotation, so the covering material 3 is held stationary.

When the control cord 634 is operated to expand the covering material 3, the engaging pawl 632 pivots and disengages from the ratchet teeth 6311 of the rotating wheel 631 so as to unlock the rotating wheel 631. Thus, the winding device 621, the casing 642, and the drive member 612 are also unlocked. At this time, the bottom rail 2 descends because the weight force of the bottom rail 2 is greater than the restoring force of the first spiral spring 611, hence the winding device 621 rotates in the first direction to release the lift cord 4 for expanding the covering material 3. In addition, rotation of the winding device 621 drives the drive member 612 to rotate such that the first spiral spring 611 is reverse wind from the storage member 613 to the drive member 612 to store the restoring force. Furthermore, the carriage 6543 is pulled to move the clutch gear 6542 along the guide slot 65411 from the engaged end 65412 to the disengaged end 65413 when the control cord 634 is pulled, such that the clutch gear 6542 is disengaged from the casing 642, whereby the reel 651 is not rotating with the casing 642.

During the expansion of the covering material 3, the winding device 621 is rotated in the first direction to rotate the casing 642 relative to the ratchet wheel 641 which is restricted by the torsion spring 643 engaging to the ratchet teeth 6411, whereby the damping force is generated so as to reduce the rotational speed of the casing 642. Therefore, the release speed of the lift cord 4 is reduced, as well as the expansion speed of the covering material 3 is reduced. When the control cord 634 is let go, the engaging pawl 632 is pivoted by resilient member 633, thus engaging to the ratchet teeth 6311 of the rotating wheel 631 such that the covering material 3 stops expanding.

When the operating cord 653 of the operating cord module 65 is pulled to ascend the bottom rail 2 for collecting the covering material 3, the reel 651 is rotated by the operating cord 653 to release the operating cord 653. At the same time, the second spiral spring 652 within the reel 651 is reverse wound by the reel 651 to store energy, and the clutch gear 6542 is rotated to move along the guide slot 65411 from the disengaged end 65413 to the engaged end 65412 by the reel 651 such that the clutch gear 6542 engages between the casing 642 and the reel 651 by toothed engagement, so the casing 642 and the reel 651 can rotate simultaneously. Under this condition, the casing 642 rotates in the second direction while the ratchet teeth 633 of the rotating wheel 631 slides over the engaging pawl 632, whereby the winding device 621 is also rotated with the casing 642 to collect the lift cord 4 for collecting the covering material 3, wherein the ratchet wheel 641 within the casing 642 is rotated by the casing 642 while the ratchet teeth 6411 slides over the torsion spring 643, therefore the damping effect is not generated. When the operating cord 653 is let go, the reel 651 is rotated by the energy from the second spiral spring 652 to wind the operating cord 653. At the same time, the clutch gear 6542 is rotated by the reel 651 to move along the guide slot 65411 from the engaged end 65412 to the disengaged end 65413 so as to disengage from the casing 642, therefore the casing 642 does not rotate with the reel 651.

FIGS. 19-24 illustrate a control device 7 according to one embodiment of the present disclosure. The control device 7 comprises a driving module 71, a lifting module 72, an unlocking module 73, a damping module, and a drive shaft 75. The driving module 71, the lifting module 72, the unlocking module 73, and the damping module are configured to operate simultaneously through the drive shaft 75. The drive shaft 75 is disposed along a longitudinal axis of the headrail 1.

The driving module 71 comprises a first spiral spring 711, a drive member 712, a reel 713, and a drive cord 714. The first spiral spring 711 comprises an outer end and an inner end, wherein the outer end is secured to an inner surface of the headrail 1, and the inner end is secured to a shaft 7121 arranged at one end of the drive member 712 along an axial direction of the drive member 712. Therefore, the first spiral spring 711 winds or unwinds about the shaft 7121 in a forward direction or a reverse direction respectively. In one embodiment of the present disclosure, a cap 7122 is sleeved to the first spiral spring 711, and the outer end of the first spiral spring 711 is secured to the cap 7122 instead, such that the winding or unwinding of the first spiral spring 711 is restricted within the cap 7122. The reel 713 is disposed parallel to the drive member 712 and sleeved to the drive shaft 75 to rotated with the drive shaft 75. One end of the drive cord 714 is secured to the drive member 712, and the other end of the drive cord 714 is secured to the reel 713.

When the covering material 3 is completely collected, the first spiral spring 711 is wound in the forward direction, and the drive cord 714 is wound around the drive member 712. During the expansion of the covering material 3, the first spiral spring 711 is operated in the reverse direction to store a restoring force, and the drive cord 714 is unwound from the drive member 712 to wind to the reel 713.

The lifting module 72 comprises at least one winding device 721 sleeved to the drive shaft 75 to rotate in the same direction with the drive shaft 75, thus the winding device 721 is driven by the drive shaft 75 to rotate in a first direction to release the lift cord 4 which passes through the covering material 3, therefore expanding the covering material 3. On the contrary, the winding device 721 is rotated in a second direction to collect the lift cord 4 which passes through the covering material 3, therefore the covering material 3 is collected.

The unlocking module 73 comprises a rotating member, a locking member, and a control member. The rotating member is a rotating wheel 731 sleeved to the drive shaft 75 to rotate simultaneously in the same direction with the drive shaft 75, wherein the rotating wheel 731 comprises ratchet teeth 7311 on its periphery. The locking member is an engaging pawl 732 which is pivotally mounted in the headrail 1 for engaging to or disengaging from the ratchet teeth 7311 of the rotating wheel 731. A resilient member 733 secured to the headrail 1 urges the engaging pawl 732 to always engage the ratchet teeth 7311 of the rotating wheel 731 when no external force is acting upon the engaging pawl 732. When the engaging pawl 732 is engaged to the ratchet teeth 7311 of the rotating wheel 731, the rotating wheel 731 is able to rotate in the second direction with the winding device 721 while the ratchet teeth 7311 sliding over the engaging pawl 732, but is not able to rotate in the first direction with the winding device 721 as the ratchet teeth 7311 is abutted by the engaging pawl 732. The control member is a control cord 734. One end of the control cord 734 is secured to the engaging pawl 732, and the other end of the control cord 734 extends out of the headrail 1 for the user to operate.

The damping module comprises a first damping member and a second damping member corresponding to each other such that the second damping member can rotate relative to the first damping member to generate a damping force. In one embodiment of the present disclosure, the damping module may be a magnetic damping module 74. The first damping member is a magnet 741 secured within the headrail 1. The second damping member is a conductor which can rotate with the drive shaft 75 simultaneously, such as a metal member, a non-magnetic metal member or an aluminum disc 742. The aluminum disc 742 is positioned corresponding to the magnet 741 such that an electromagnetic induction force can be generated between the magnet 741 and the aluminum disc 742 when the aluminum disc 742 is rotated by the drive shaft 75, whereby damping effect is generated. The electromagnetic induction area and the relative speed between the magnet 741 and the aluminum disc 742 affect the strength of the electromagnetic induction force. Therefore, the damping effect can be adjusted by varying the area or number of magnets 741 or varying the rotational speed of the conductor. In one embodiment of the present disclosure, a speed change module 76 may be provided to engage between the drive shaft 75 and the aluminum disc 742 by a toothed engagement. The speed change module 76 comprises two planetary gear accelerators 761 connected to each other for increasing the rotational speed of the aluminum disc 742, thereby enhancing the damping effect. In addition, the magnet 741 is secured to a support 743, and an adjusting screw 744 is screwed through the support 743. Operation of the adjusting screw 744 causes the support 743 to move in the axial direction of the adjusting screw 744 so as to vary the overlapping area between the magnet 741 and the aluminum disc 742, thereby adjusting the damping force.

A first one-way clutch module 77 is provided between an input end 7611 of the planetary gear accelerator 761 and the drive shaft 75. The input end 7611 of the planetary gear accelerator 761 is engaged to the drive shaft 75 through the first one-way clutch module 77 while the drive shaft 75 is rotating in the first direction for expanding the covering material 3. On the contrary, the input end 7611 of the planetary gear accelerator 761 is disengaged from the drive shaft 75 through the first one-way clutch module 77 while the drive shaft 75 is rotating in the second direction for collecting the covering material 3.

When the covering material 3 is completely collected, the engaging pawl 732 is engaged to the ratchet teeth 7311 of the rotating wheel 731 to lock the rotating wheel 731 from rotation, such that the drive shaft 75 and the winding device 721, which are configured to rotate simultaneously with the rotating wheel 731, are also locked from rotation. Therefore, the first direction rotation of the winding device 721 is restricted, and the covering material 3 is held in the collected state.

When the control cord 734 is operated for expanding the covering material 3, the engaging pawl 732 is driven by the control cord 734 to pivot and disengage from the ratchet teeth 7311 of the rotating wheel 731 so as to unlock the rotating wheel 731. At the same time, the bottom rail 2 descends to expand the covering material 3 because the weight force of the bottom rail 2 is greater than the restoring force from the first spiral spring 711 acting upon the drive member 712 and the reel 713, and thus the winding device 721 is rotated in the first direction to release the lift cord 4, hence the covering material 3 is expanded. Meanwhile, the reel 713 and the rotating wheel 731 are driven to rotate by the winding device 721 through the drive shaft 75, wherein the reel 713 winds the drive cord 714 wound on the drive member 712 from the drive member 712, whereby the drive member 712 rotates to urge the first spiral spring 711 winding reversely about the shaft 7121 for storing the restoring force.

During the expansion of the covering material 3, the drive shaft 75 is driven by the winding device 721 to rotate in the first direction, whereby the input end 7611 of the planetary gear accelerator 761 is engaged to the drive shaft 75 through the first one-way clutch module 77 such that the planetary gear accelerator 761 is rotated by the drive shaft 75 to drive the aluminum disc 742 of the magnetic damping module 74 to rotate relative to the magnet 741, and thus the damping force is generated for reducing the rotational speed of the input end 7611 of the planetary gear accelerator 761, the drive shaft 75, and the winding device 721. Therefore, the release speed of the lift cord 4 is reduced, as well as the expansion speed of the covering material 3 is reduced.

While collecting the covering material 3, the user pushes the bottom rail 2 upward, such that the first spiral spring 711 is wound in the forward direction to provide the restoring force which rotates the drive member 712 for winding the drive cord 714 from the reel 713 to the drive member 712, whereby the drive shaft 75 is driven to rotate the winding device 721 in the second direction for collecting the lift cord 4. Meanwhile, the rotating wheel 731 rotates with the drive shaft 75 in the second direction while the ratchet teeth 7311 sliding over the engaging pawl 732, regardless of the resilient member 733 urging the engaging pawl 732 to engage the ratchet teeth 7311 of the rotating wheel 731. In addition, the input end 7611 of the planetary gear accelerator 761 is disengaged from the drive shaft 75 through the first one-way clutch module 77 while the drive shaft 75 is rotating in the second direction such that the aluminum disc 742 of the magnetic damping module 74 is not rotated. Therefore, the damping force is not generated while the collection of the covering material 3.

Figure 25:
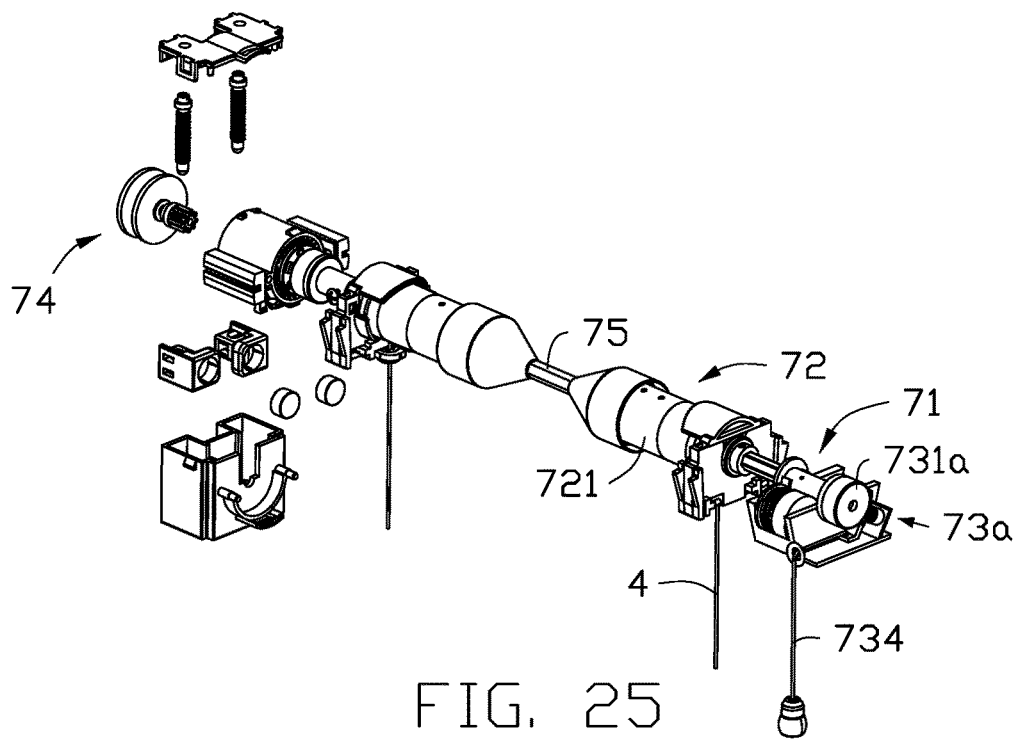
FIG. 25 is an exploded perspective view of a control device according to another embodiment of the present disclosure.
Figure 26:
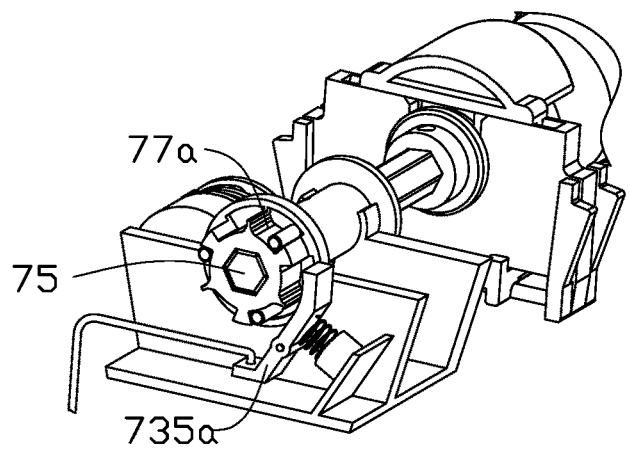
FIG. 26 is a perspective view of an unlocking module of a control device in FIG. 25.
Figure 27:
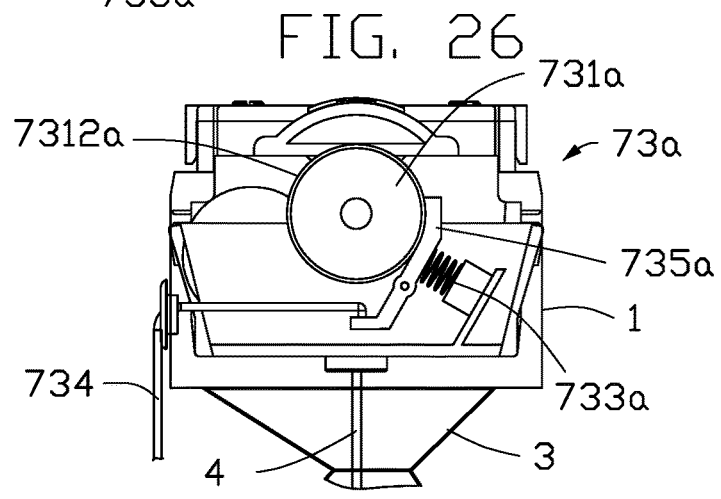
FIG. 27 is a side view of the control device in FIG. 25.
Figure 28:
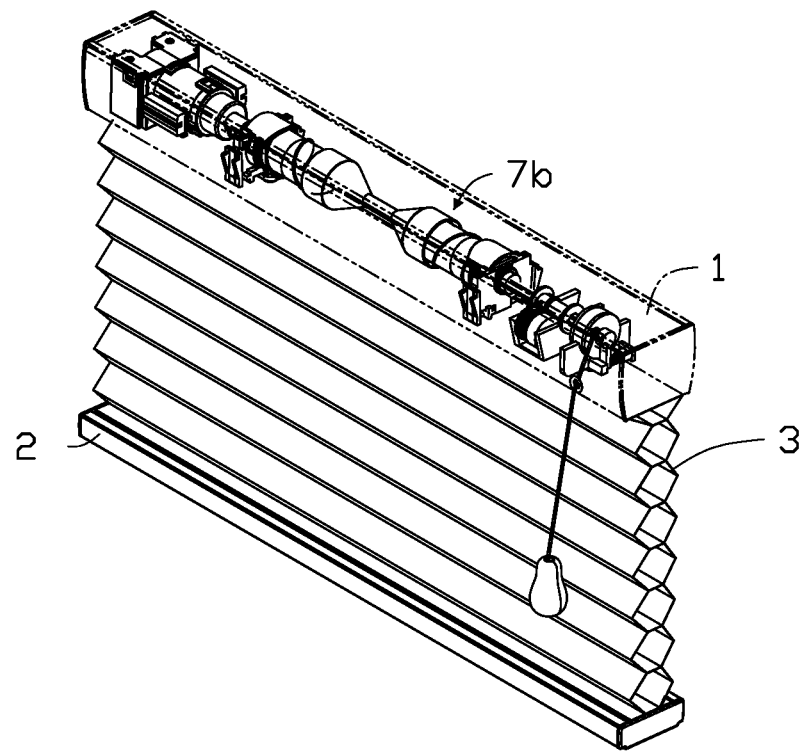
FIG. 28 is a perspective view of a window covering system according to another embodiment of the present disclosure.
Figure 29:
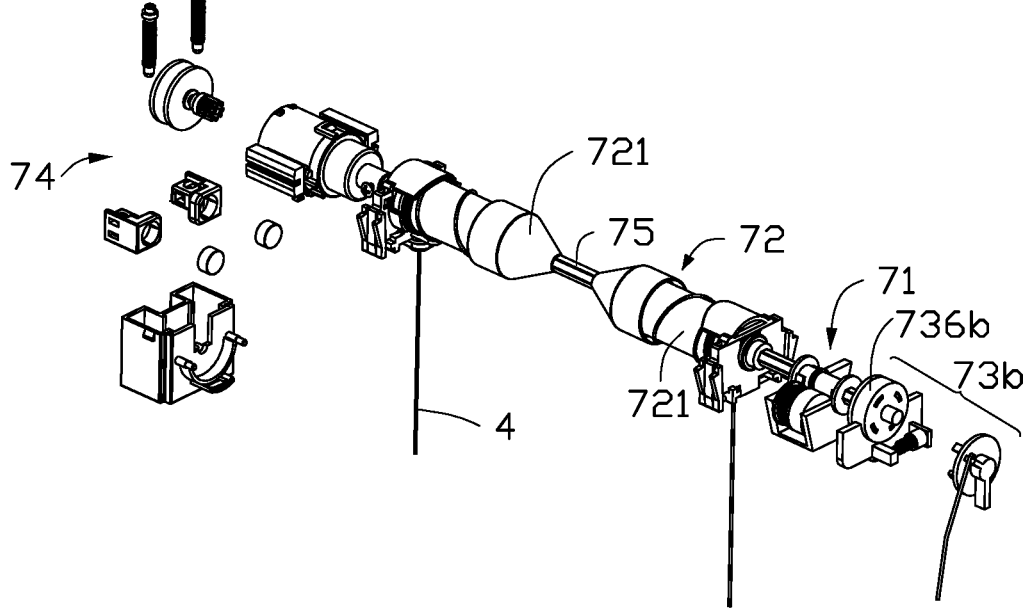
FIG. 29 is an exploded perspective view of a control device in FIG. 28.
Figure 30:
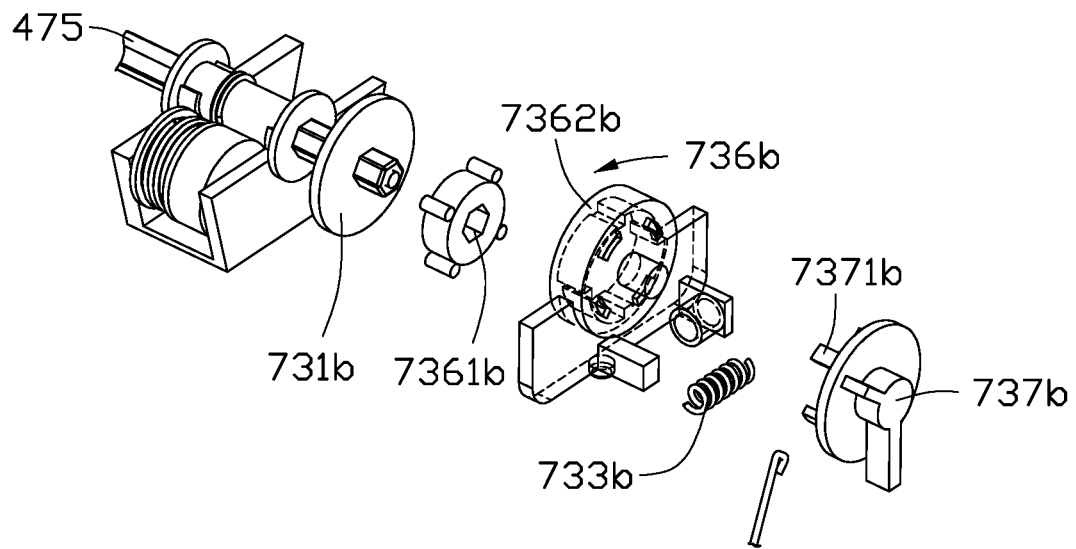
FIG. 30 is an exploded perspective view of an unlocking module of the control device in FIG. 28.
Figure 31:
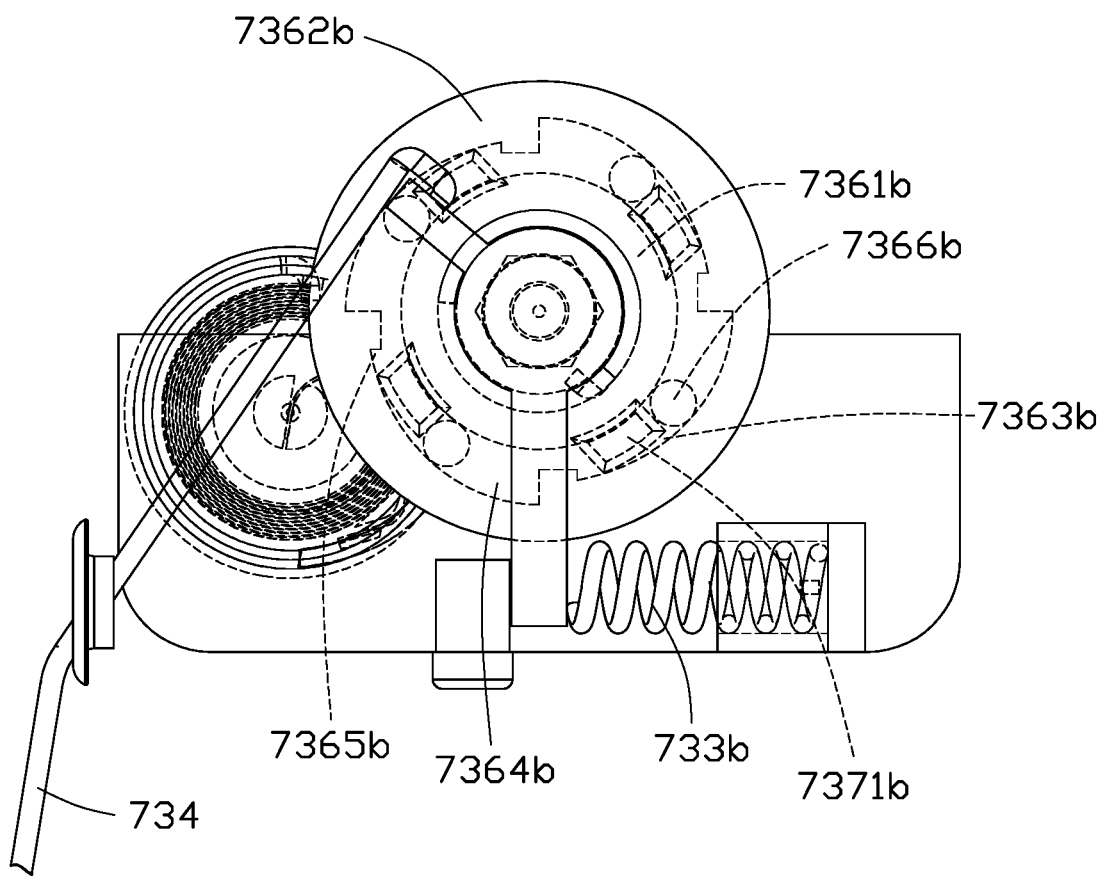
FIG. 31 is a side view of the unlocking module of the control device in FIG. 28.
Figure 32:
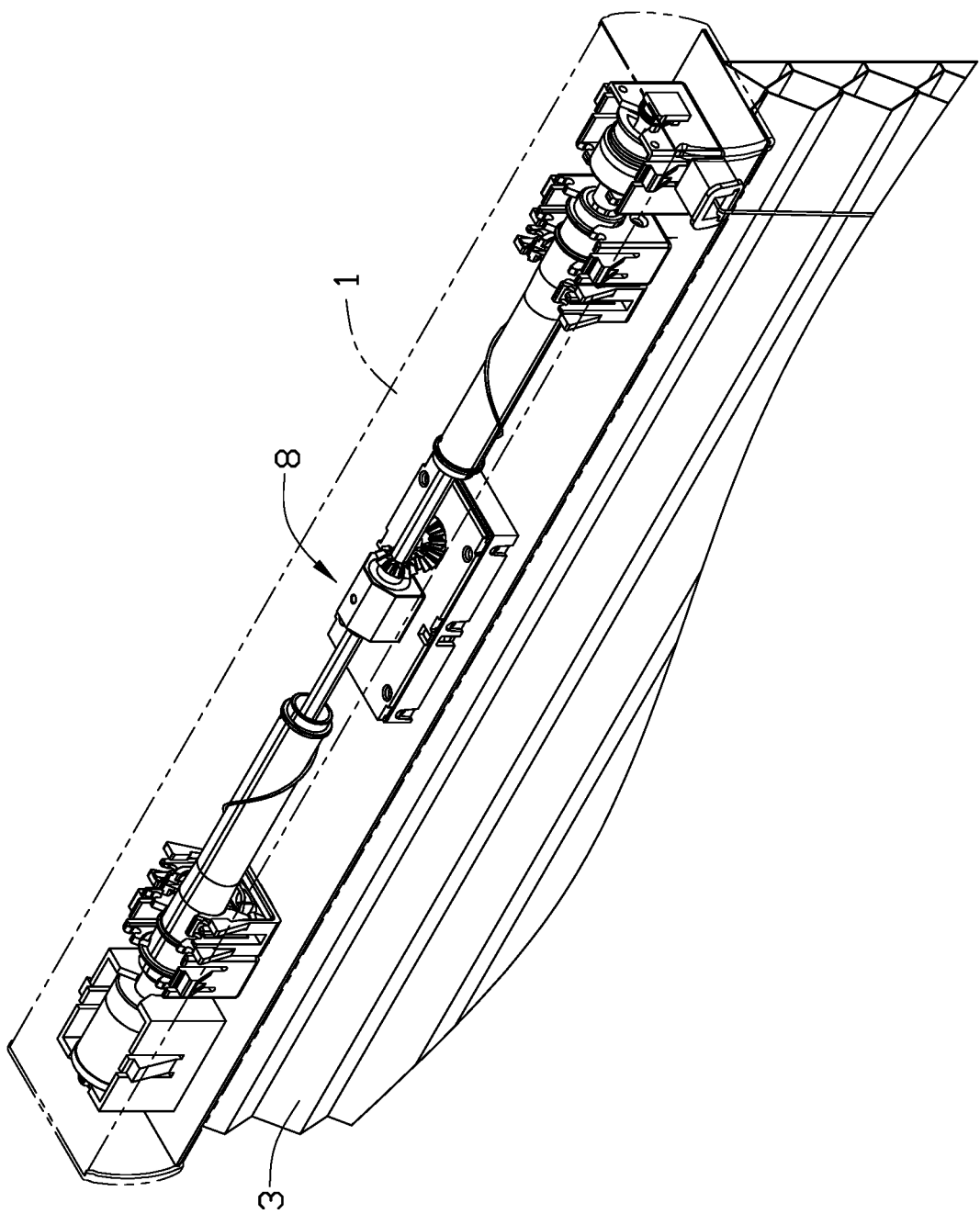
FIG. 32 is a perspective view of a control device according to another embodiment of the present disclosure.
Figure 33:
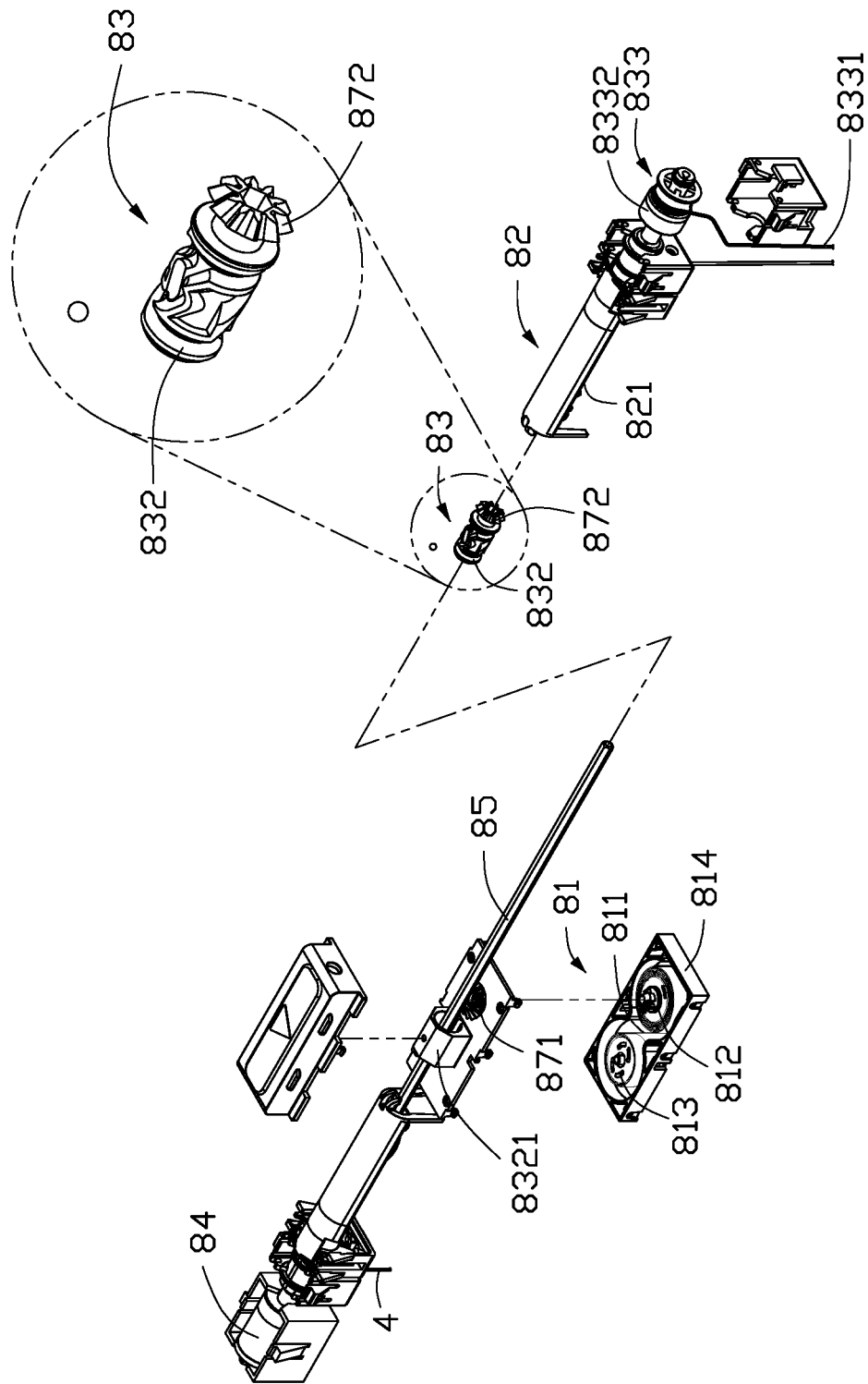
FIG. 33 is an exploded perspective view of the control device in FIG. 32.
Figure 34:
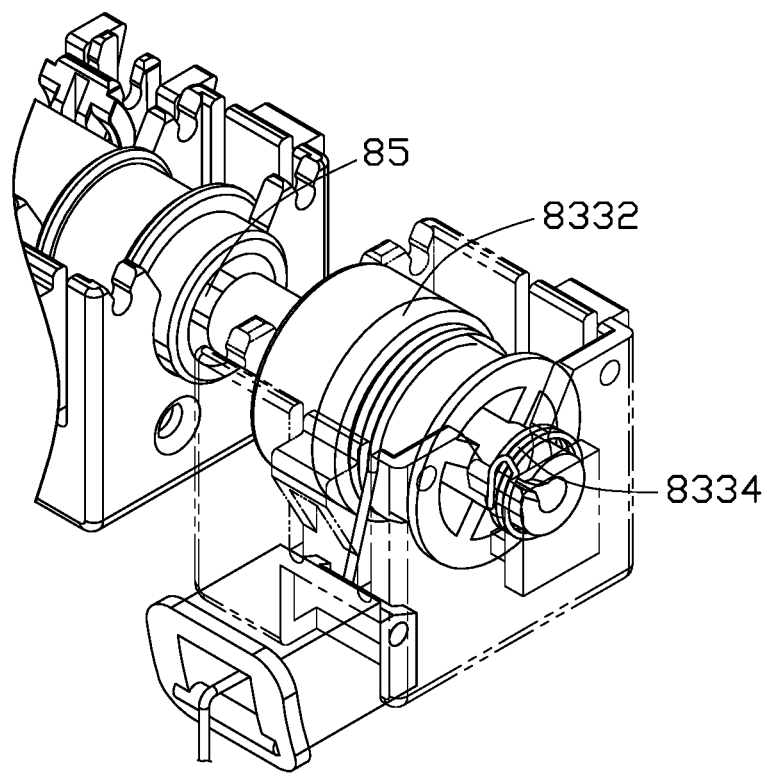
FIG. 34 is a perspective view of a control assembly of an unlocking module of the control device in FIG. 32.
Figure 35:
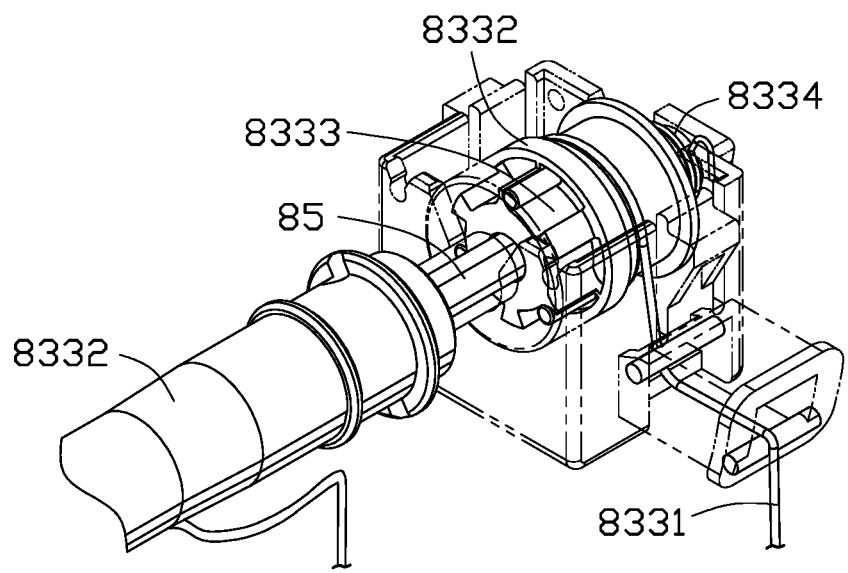
FIG. 35 is another perspective view of the control assembly of the unlocking module of the control device in FIG. 32.
Figure 36:
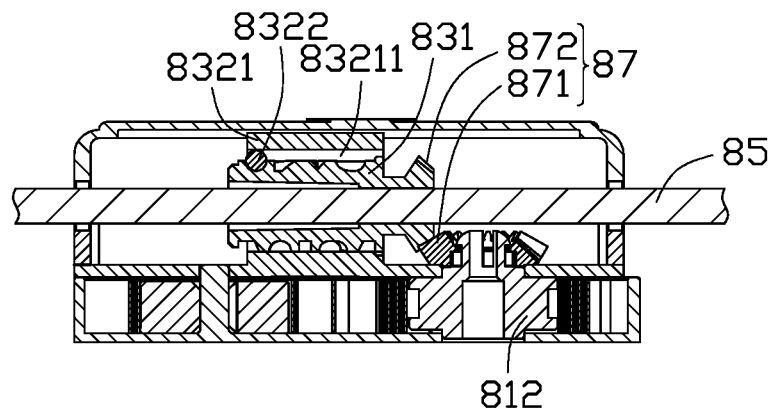
FIG. 36 is a partial cross-sectional front view of the control device in FIG. 32.
Figure 37:
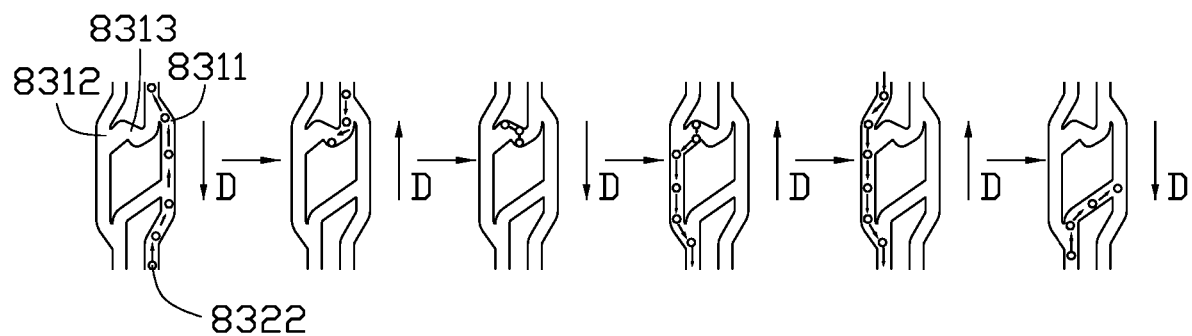
FIG. 37 is a series of schematic views of operating a locking member of the unlocking module of the control device in FIG. 32.
Figure 38:
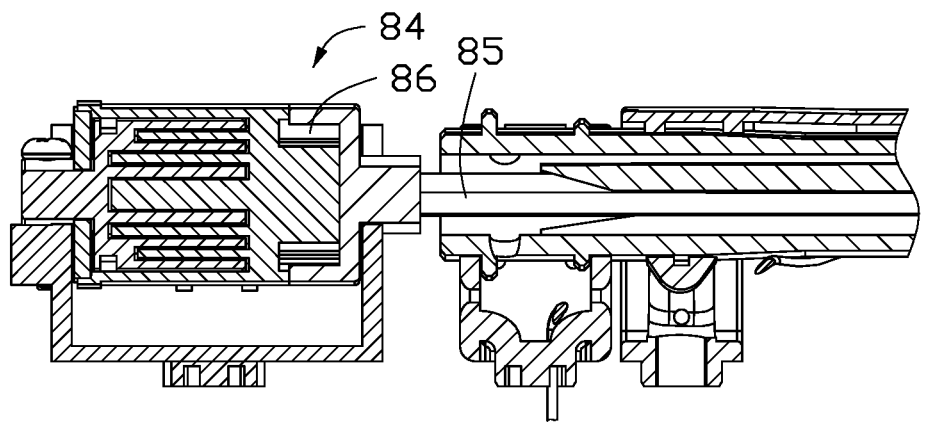
FIG. 38 is a cross-sectional front view of a damping module of the control device in FIG. 32.
Figure 39:
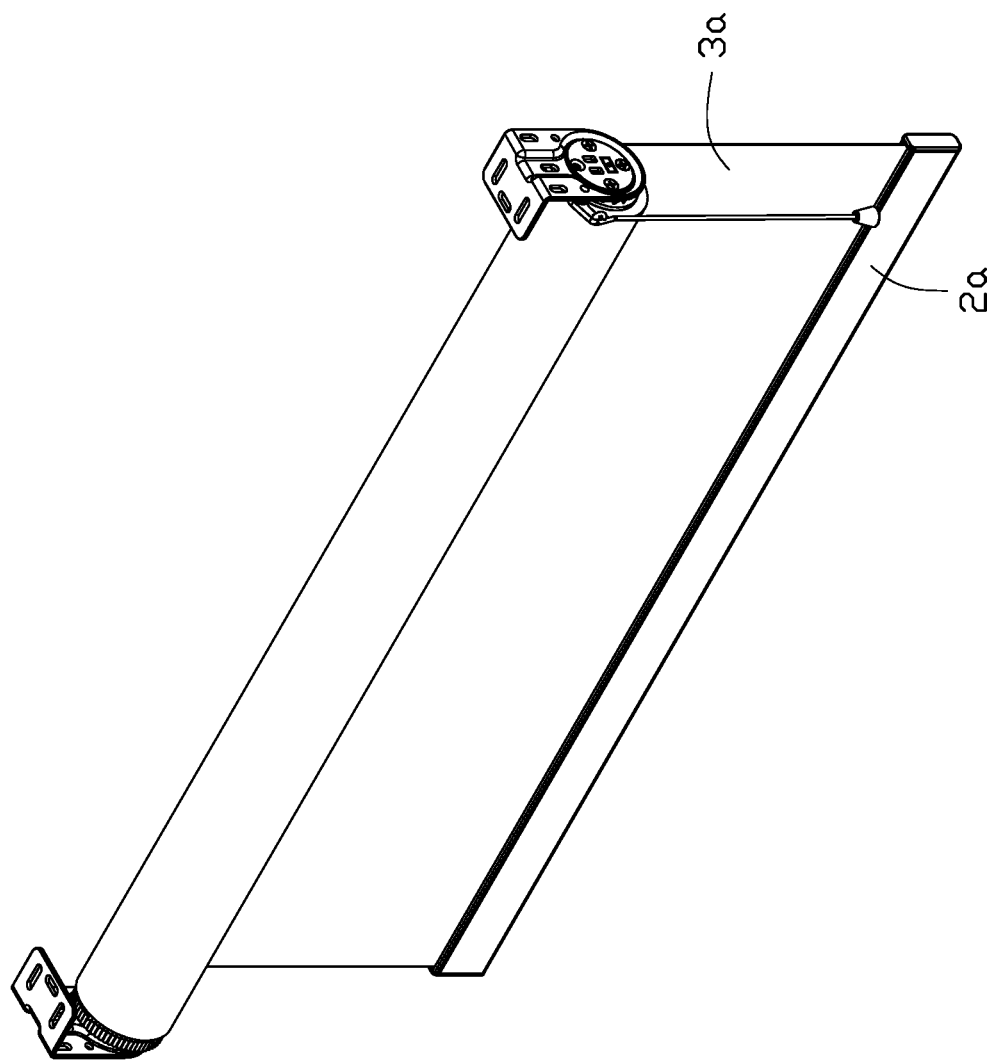
FIG. 39 is a perspective view of a window covering system according to another embodiment of the present disclosure.
Figure 40:
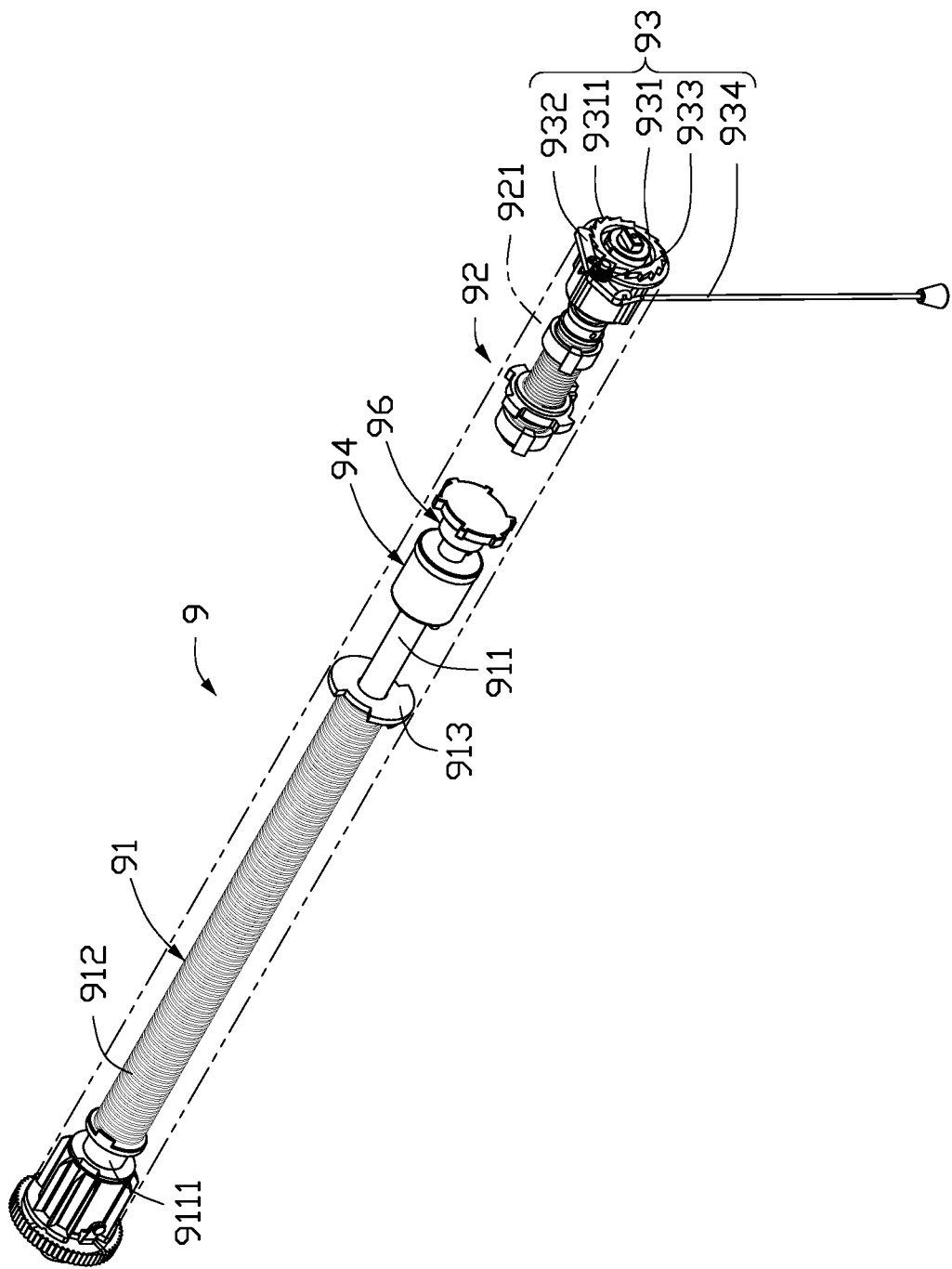
FIG. 40 is a perspective view of a control device in FIG. 39.
Figure 41:
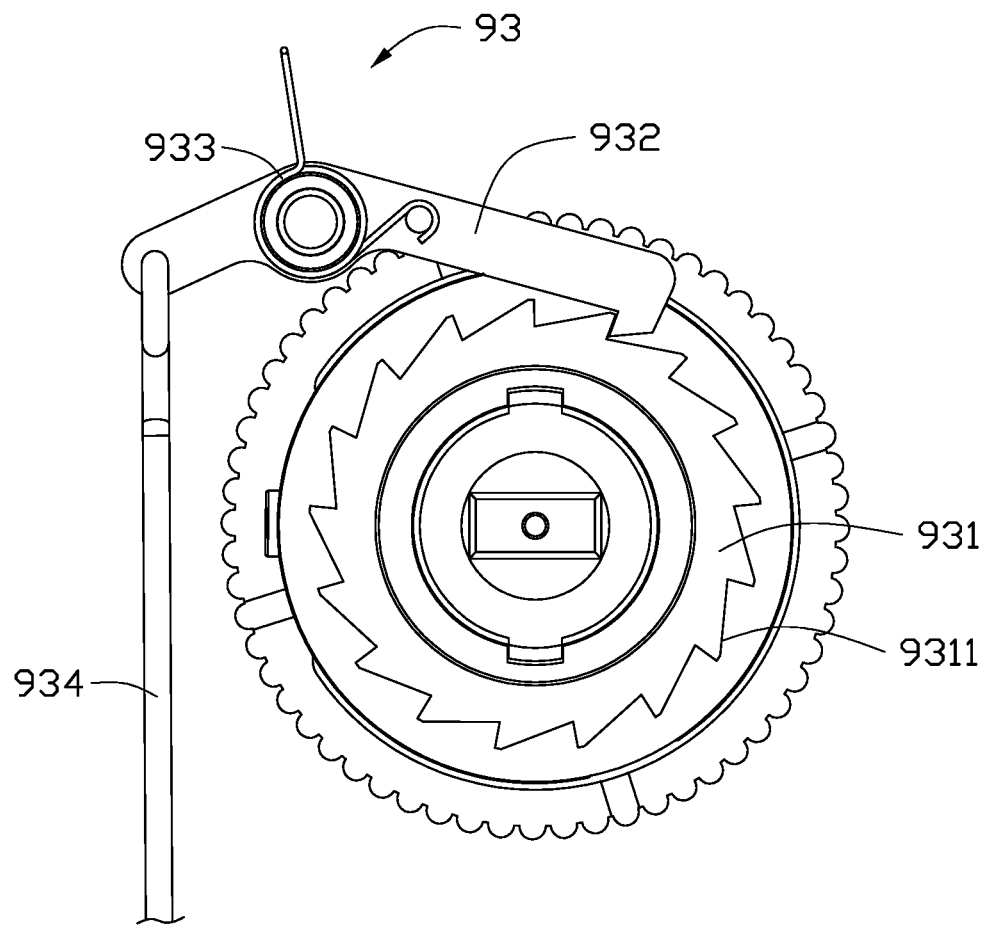
FIG. 41 is a side view of an unlocking module of the control device in FIG. 39.
Figure 42:
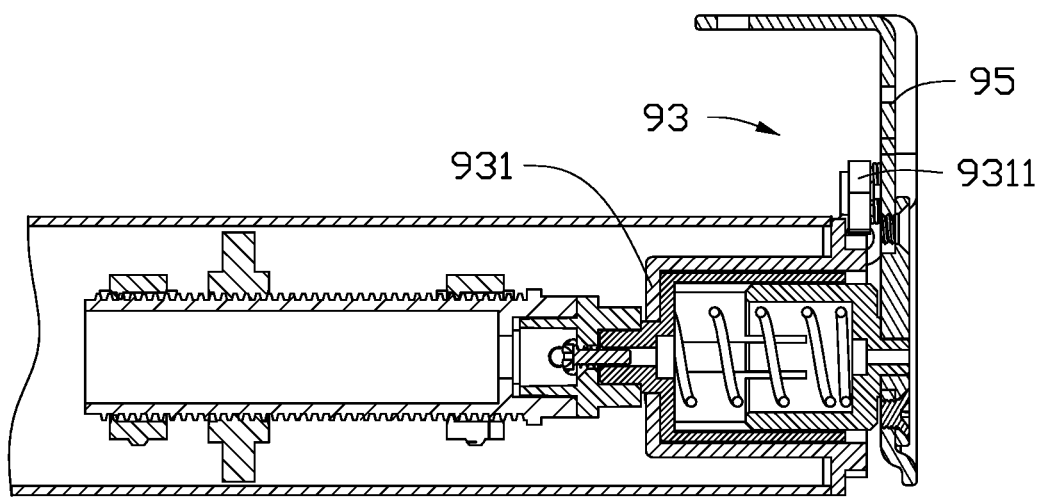
FIG. 42 is a cross-sectional front view of the unlocking module of the control device in FIG. 39.
Figure 43:
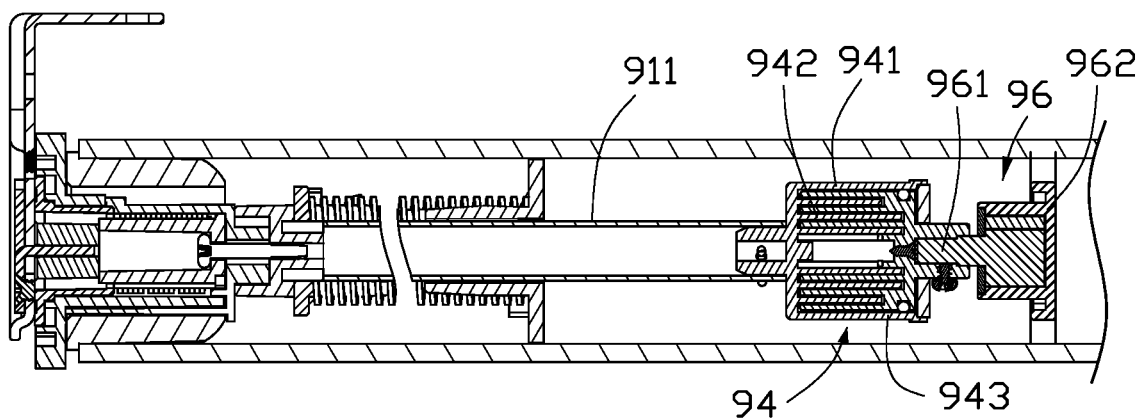
FIG. 43 is a cross-sectional front view of a driving module and a damping module of the control device in FIG. 39.

FIGS. 25-27 illustrate a control device 7a according to one embodiment of the present disclosure. The control device 7a comprises the driving module 71, the lifting module 72, an unlocking module 73a, the magnetic damping module 74, and the drive shaft 75. The driving module 71, the lifting module 72, the magnetic damping module 74, and the drive shaft 75 are the same as foregoing. The unlocking module 73a comprises a rotating member, a locking member, and a control member. The rotating member is a rotating wheel 731a sleeved to the drive shaft 75, wherein the rotating wheel 731a comprises a friction surface 7312a at periphery thereof. A second one-way clutch module 77a is provided between the rotating wheel 731a and the drive shaft 75. The rotating wheel 731a is engaged to the drive shaft 75 through the second one-way clutch module 77a while the drive shaft 75 is rotating in the first direction for expanding the covering material 3. On the contrary, the rotating wheel 731a is disengaged from the drive shaft 75 through the second one-way clutch module 77a while the drive shaft 75 is rotating in the second direction for collecting the covering material 3. The locking member is a friction pawl 735a which is pivotally mounted in the headrail 1 to selectively abut the friction surface 7312a of the rotating wheel 731a. A resilient member 733a secured to the headrail 1 is configured to urge the friction pawl 735a to always abut the friction surface 7312a of the rotating wheel 731a when no external force is acting upon the friction pawl 735a. The control member is a control cord 734 with two ends, wherein one end of the control cord 734 is secured to the friction pawl 735a, and the other end of the control cord 734 extends out of the headrail 1 for the user to operate.

When the covering material 3 is completely collected, the friction pawl 735a abuts the friction surface 7312a of the rotating wheel 731a to lock the rotating wheel 731a from rotation by friction, such that the drive shaft 75 and the winding device 721 are also locked from rotation, regardless of the weight force from the bottom rail 2 acting upon the winding device 721. Therefore, the covering material 3 is held in the collected state.

When the control member 734 is pulled for expanding the covering material 3, the friction pawl 735a is driven to pivot away from the friction surface 7312a of the rotating wheel 731a so as to unlock the rotating wheel 731a, whereby the drive shaft 75 and the winding device 721 are also unlocked. Under this condition, the winding device 721, the drive shaft 75, and the rotating wheel 731a can rotate in the first direction due to the weight force from the bottom rail 2, and thus releasing the lift cord 4 for expanding the covering material 3. During the collection of the covering material 3, the friction pawl 735a still abuts the friction surface 7312a of the rotating wheel 731a due to the resilient member 733a urging the friction pawl 735a, but the drive shaft 75 is disengaged from the rotating wheel 731 through the second one-way clutch module 77a while the drive shaft 75 rotating in the second direction, such that the rotation of the drive shaft 75 is not affected by the friction.

FIGS. 28-31 illustrate a control device 7b according to one embodiment of the present disclosure. The control device 7b comprises the driving module 71, the lifting module 72, an unlocking module 73b, the magnetic damping module 74, and the drive shaft 75. The driving module 71, the lifting module 72, the magnetic damping module 74, and the drive shaft 75 are the same as foregoing. The unlocking module 73b comprises a rotating member, a locking member, and a control member. The rotating member is a rotating wheel 731b sleeved to the drive shaft 75 to rotate with the drive shaft 75 simultaneously in the same direction. The locking member is a roller clutch 736b having an input portion 7361b and a fixed portion 7362b coaxial to each other, wherein the input portion 7361b is arranged within the fixed portion 7362b and is sleeved to the drive shaft 75 for rotating with the drive shaft simultaneously in the same direction, while the fixed portion 7362b is fixed to the headrail 1. The locking member further comprises a clutch assembly which is arranged between the input portion 7361b and the fixed portion 7362b. The clutch assembly comprises at least one wedge-shaped space 7363b and at least one roller 7366b corresponding to the at least one wedge-shaped space 7363b with a wide end 7364b and a narrow end 7365b, such that the roller 7366b can move between the wide end 7364b and the narrow end 7365b. The control member comprises a disc 737b and a control cord 734, wherein the disc 737b is sleeved to the drive shaft 75 but is not rotated with the drive shaft 75. The disc 737b comprises at least one projection 7371b corresponding to the at least one wedge-shaped space 7363b. Each of the at least one projection 7371b is arranged in a corresponding wedge-shaped space 7363b, and is movable between the wide end 7364b and the narrow end 7365b of the wedge-shaped space 7363b, wherein the projection 7371b is closer to the narrow end 7365b of the wedge-shaped space 7363b relative to the roller 7366b, and the roller 7366b is closer to the wide end 7364b of the wedge-shaped space 7363b relative to the projection 7371b. A resilient member 733b secured to the headrail 1 urges the disc 737b such that the projection 7371b stays at the narrow end 7365b of the wedge-shaped space 7363b when no external force is applied to the disc 737b. The control cord 734 is secured to the disc 737b to be pulled for rotating the disc 737b, whereby the projection 7371b of the disc 737b moves the roller 7366b within the wedge-shaped space 7363b such that the roller 7366b moves toward the wide end 7364b.

When the covering material 3 is completely collected, the weight force from the bottom rail is acting upon the winding device 721 of the lifting module 72 such that urges the winding device 721 toward the first direction, and thus the input portion 7361b of the roller clutch 736b is engaged to the fixed portion 7362b by the roller 7366b which is moved to the narrow end 7365b of the wedge-shaped space 7363b by rotating with the drive shaft 75 in the first direction. At this moment, the fixed portion 7362b is secured to the headrail 1, therefore further rotation of the input portion 7361b is restricted such that rotation of the drive shaft 75 sleeved by the input portion 7361b is restricted as well. Hence, the covering material 3 is held in the collected state.

When the control member 734 is pulled for expanding the covering material 3, the disc 737b is driven to rotate such that the projection 7371b of the disc 737b moves toward the wide end 7364b of the wedge-shaped space 7363b, and thus the roller 7366b is moved toward the wide end 7364b, whereby the input portion 7361b is disengaged from the fixed portion 7362b when the roller 7366b is at the wide end 7364b. Therefore, the input portion 7361b can rotate freely in the first direction such that the drive shaft 75 and the winding device 721 of the lifting module 72 can also rotate freely in the first direction. Under this condition, the winding device 721 is rotated in the first direction to release the lift cord 4, and the covering material 3 is expanded.

During the collection of the covering material 3, the drive shaft 75 is rotated in the second direction to rotate the input portion 7361b, thus the roller 7366b is moved by the input portion 7361b toward the wide end 7364b of the wedge-shaped space 7363b, whereby the input portion 7361b is disengaged from the fixed portion 7362b such that the input portion 7361b and the drive shaft 75 can rotate freely in the second direction in order to drive the winding device 721 of the lifting module 72 for collecting the lift cord 4. Hence, the covering material 3 is collected.

FIGS. 32-38 illustrate a control device 8 according to one embodiment of the present disclosure. The control device 8 comprises a driving module 81, a lifting module 82, an unlocking module 83, a damping module 84, and a drive shaft 85. The driving module 81, the lifting module 82, the unlocking module 83, and the damping module 84 are configured to operate simultaneously through the drive shaft 85 which is disposed along a longitudinal axis of the headrail 1.

The driving module 81 comprises a first spiral spring 811, a drive member 812, and a storage member 813. The drive member 812 and the storage member 813 are arranged within the headrail 1, wherein the axial directions of the drive member 812 and the storage member 813 are parallel to the radial direction of the headrail 1. The first spiral spring 811 comprises two ends, wherein one end of the first spiral spring 811 is secured to the drive member 812, and the other end of the first spiral spring 811 is secured to the storage member 813, and thus the first spiral spring 811 can wind to the drive member 812 reversely to store a restoring force or can rewind to the storage member 813 forwardly to release the restoring force. In one embodiment of the present disclosure, the driving module 81 may further comprises a base 814, wherein the first spiral spring 811, the drive member 812, and the storage member 813 can be installed on the base 814 such that the driving module 81 can be assembled as a single modular device which can be easily mounted.

The lifting module 82 comprises a winding device 821 sleeved to the drive shaft 85 to rotate with the drive shaft 85 simultaneously in the same direction. The winding device 821 is rotated in a first direction to release the lift cord 4 when the covering material 3 is expanded, and the winding device 821 is rotated in a second direction to collect the lift cord 4 when the covering material 3 is collected.

The unlocking module 83 comprises a rotating member, a locking member, and a control member. The rotating member is a rotating wheel 831 sleeved to the drive shaft 85 to rotate with the drive shaft 85 simultaneously in the same direction. The locking member is a groove ball clutch 832 comprising an input portion which is the rotating wheel 831, a fixed portion 8321 secured to the headrail 1 and coaxially arranged around the rotating wheel 831, and a clutch assembly arranged between the fixed portion 8321 and the rotating wheel 831, wherein the clutch assembly of the locking member comprises a plurality of grooves defined between the rotating wheel and the fixed portion, and the locking member further comprises a movable ball disposed between the rotating wheel and the fixed portion. The plurality of grooves are a first groove 8311, a second groove 8312, a locking groove 8313, and a limiting groove 83211, wherein the first groove 8311 and the second groove 8312 are looped grooves defined substantially radially at exterior surface of the rotating wheel 831 and in communication with each other, and the locking groove 8313 is arranged between the first groove 8311 and the second groove 8312. The fixed portion 8321 comprises the limiting groove 83211 defined substantially longitudinally at the radial interior surface of the fixed portion 8321. The limiting groove 83211 of the fixed portion 8321 and the first groove 8311, the second groove 8312, and the locking groove 8313 of the rotating wheel 831 are in communication with each other, such that a ball 8322 can be movably disposed between the limiting groove 83211, the first groove 8311, the second groove 8312, and the locking groove 8313. When the ball 8322 is disposed between the limiting groove 83211 and the first groove 8311 or between the limiting groove 83211 and the second groove 8312, the ball 8322 is free to move therein, thus the rotating wheel 831 is disengaged from the fixed portion 8321 such that the drive shaft 85 is free to rotate. When the ball 8322 is disposed between the limiting groove 83211 and the locking groove 8313, the ball 8322 is restricted from moving therein, thus the rotating wheel 831 is engaged to the fixed portion 8321 to lock the drive shaft 85 from rotation. The control member is a control cord assembly 833 having a control cord 8331, a reel 8332 for collecting or releasing the control cord 8331, a one-way clutch 8333, and a resilient member 8334, wherein the reel 8332 is sleeved to the drive shaft 85, and the reel 8332 is configured to engage to or disengage from the drive shaft 85 through the one-way clutch 8333. One end of the resilient member 8334 is secured to the headrail 1, and the other end of the resilient member 8334 is secured to the reel 8332. The resilient member 8334 urges the reel 8332 back to its original position when the reel 8332 is rotated by external force. The arrow D in FIG. 37 indicates the rotational direction of the drive shaft 85.

When the control cable 8331 is pulled, the reel 8332 is rotated to release the control cable 8331 such that engaging to the drive shaft 85 through the one-way clutch 8333 to rotate the drive shaft 85 in the second direction. When the drive shaft 85 rotates in the first direction, or when the drive shaft 85 rotates in the second direction while the reel 8332 being stationary, the reel 8332 is disengaged from the drive shaft 85 through the one-way clutch 8333 so the reel 8332 and the drive shaft 85 are not rotating simultaneously.

The damping module 84 is sleeved to the drive shaft 85 and is able to generate a damping force. A one-way clutch module 86 is provided between the damping module 84 and the drive shaft 85. The damping module 84 is engaged to the drive shaft 85 through the one-way clutch module 86 to generate a damping force so as to reduce the rotational speed of the drive shaft 85 when the drive shaft 85 is rotating in the first direction. The damping module 84 is disengaged from the drive shaft 85 through the one-way clutch module 86 when the drive shaft 85 is rotating in the second direction, so no damping effect is generated. In one embodiment of the present disclosure, the damping module 84 may be, but not limited to, an oil damping module or a magnetic damping module.

A steering gear module 87 is provided between the drive member 812 of the driving module 81 and the rotating wheel 831 of the unlocking module 83, wherein the steering gear module 87 comprises a first bevel gear 871 and a second bevel gear 872 engaged to each other perpendicularly by toothed engagement. The first bevel gear 871 is secured to the drive member 812 such that both rotating in the same direction, and the second bevel gear 872 is coaxially secured to the rotating wheel 831. As the rotating wheel 831 is configured to rotate in the same direction with the drive shaft 85 simultaneously, the drive member 812 drives the drive shaft 85 to rotate in the first direction or the second direction through the steering gear module 87 when the first spiral spring 811 urges the drive member 812 rotating.

When the covering material 3 is completely collected, the weight force of the bottom rail causes the winding device 821 to rotate in the first direction so as to rotate the drive shaft 85 and the rotating wheel 831 in the first direction. At this moment, the ball 8322 moves from the first groove 8311 toward the locking groove 8313 due to the rotation of the rotating wheel 831. When the ball 8322 is in the locking groove 8313, the rotating wheel 831 is engaged to the fixed portion 8321, thereby restricting rotation of the rotating wheel 831 in the first direction, as well as restricting rotation of the winding device 821 and the drive shaft 85 in the first direction.

When the control cord 8331 is pulled for expanding the covering material 3, the reel 8332 is rotated by the control cord 8331 in the second direction for releasing the control cord 8331 such, and the reel 8332 engages the drive shaft 85 through the one-way clutch 8333 so as to rotate the drive shaft 85 and the rotating wheel 831 in the second direction. At this moment, the ball 8322 moves from the locking groove 8313 toward the second groove 8312 due to the rotation of the rotating wheel 831 in the second direction. When the ball 8322 is in the second groove 8312, the rotating wheel 831 is disengaged from the fixed portion 8321 to unlock the drive shaft 85, wherein the ball 8322 is free to move within the second groove 8312. The drive member 812 and the winding device 821 are also unlocked. When the operating cord 8331 is let go from being pulled, the winding device 821, the drive shaft 85, and the rotating wheel 831 are rotated in the first direction due to the weight force from the bottom rail which is greater than the restoring force from the first spiral spring 811, such that the drive shaft 85 drives the one-way clutch 8333 to rotate in the first direction. At the same time, the drive shaft 85 disengages from the reel 8332 to rotate in the first direction solely, and the winding device 821 releases the lift cord 4 for expanding the covering material 3. Meanwhile, the drive member 812 is rotated by the drive shaft 85, and thus the first spiral spring 811 winds reversely from the storage member 813 toward the drive member 812 for storing the restoring force.

During the expansion of the covering material 3, the damping module 84 is engaged to the drive shaft 85 through the one-way clutch module 86 to generate the damping force so as to reduce the rotational speed of the drive shaft 85 when the drive shaft 85 is rotating in the first direction. Therefore, the rotational speed of the winding device 821 is also reduced. Hence, the release speed of the lift cord 4 is reduced, as well as the expansion speed of the covering material 3 is reduced.

To collect the covering material 3, the bottom rail is pushed upward, such that the first spiral spring 811 releases the restoring force while rewinding from the drive member 812 to the storage member 813 to rotate the drive member 812 so as to rotate the rotating wheel 831, the winding device 821, and the drive shaft 85 in the second direction. At the same time, the ball 8322 moves within a space between the first groove 8311 and the limiting groove 83211 due to rotation of the rotating wheel 831, such that the rotating wheel 831 is disengaged from the fixed portion 8321 to rotate freely, and the winding device 821 is rotated in the second direction to collect the lift cord 4, whereby collecting the covering material 3. During the collection of the covering material 3, the damping module 84 and the reel 8332 are disengaged from the drive shaft 85 through the one-way clutch module 86 and the one-way clutch 8333 respectively, therefore not operating with the drive shaft 85.

FIGS. 39-43 illustrate a control device 9 according to one embodiment of the present disclosure. The control device 9 comprises a driving module 91, a lifting module 92, an unlocking module 93, and a damping module which are positioned one after another.

The driving module 91 comprises a fixed rod 911, a coil spring 912, and a drive member 913. The fixed rod 911 comprises a stopper 9111 on one end thereof, and the coil spring 912 and the drive member 913 are sleeved to the fixed rod 911, wherein one end of the coil spring 912 is secured to the stopper 9111, and the other end of the coil spring 912 is secured to the drive member 913, such that the drive member 913 rotates about an longitudinal axis of the fixed rod 911 to twist the coil spring 912 for storing a restoring force as the coil spring 912 extends or compresses.

The lifting module 92 comprises winding device, wherein the winding device is a roller tube 921 according to one embodiment of the present disclosure. The driving module 91 is secured within the roller tube 921 such that the outer periphery of the drive member 913 is engaged to the inner surface of the roller tube 921, and thus the drive member 913 can rotate with the roller tube 921 simultaneously in the same direction. The top edge of the covering material 3a is secured to roller tube 921. Therefore, the roller tube 921 can rotate in a first direction to release the covering material 3a; and the roller tube 921 can rotate in a second direction to collect the covering material 3a.

The unlocking module 93 comprises a rotating member, a locking member, and a control member. The rotating member is a rotating wheel 931 secured at one end within the roller tube 921 for rotating with the roller tube 921. The rotating wheel 931 comprises ratchet teeth 9311 at one end on outer periphery. The locking member is an engaging pawl 932 which can be pivoted to engage to or disengage from the ratchet teeth 9311 of the rotating wheel 931. The engaging pawl 932 abuts the ratchet teeth 9311 to lock the rotating wheel 931 when the rotating wheel 931 is about to rotate in the first direction; and the ratchet teeth 9311 of the rotating wheel 931 can slide over the engaging pawl 932 when the rotating wheel 931 is driven by the roller tube 932 to rotate in the second direction. A resilient member 933 is provided to urge the engaging pawl 932 to always engage the ratchet teeth 9311 of the rotating wheel 931 when no external force is acting upon the engaging pawl 932. The control member is a control cord 934. One end of the control cord 934 is secured to the engaging pawl 932, and the other end of the control cord 934 is provided for the user to operate.

In one embodiment of the present disclosure, the control device 9 may be installed in a roller shade. The roller shade further comprises two fixed members 95 placed at two ends of the roller tube 921, such that the engaging pawl 932 is pivotally mounted on one of the fixed members 95. One end of the resilient member 933 is secured to the fixed member 95 adjacent to the engaging pawl 932, and the other end of the resilient member 933 is secured to the engaging pawl 932 for urging the engaging pawl 932.

The damping module is disposed within the roller tube 921, and comprises a first damping member and a second damping member disposed corresponding to each other such that a damping force can be generated in between. In one embodiment of the present disclosure, the damping module may be an oil damping module 94. The first damping member is a housing 941 secured to the fixed rod 911, and the second damping member is a disturbing member 942 disposed in the housing 941. A fluid is filled between the housing 941 and the disturbing member 942, wherein the fluid is a damping oil 943 according to one embodiment of the present disclosure. A one-way clutch module 96 is provided between the oil damping module 94 and the roller tube 921, such that an output end 961 of the one-way clutch module 96 is connected to the disturbing member 942, and an input end 962 of the one-way clutch module 96 is connected to the inner surface of the roller tube 921, and thus the input end 962 is rotated with the roller tube 921 simultaneously. When the roller tube 921 is rotating in the first direction, the input end 962 rotates in the first direction and engages to the output end 961, such that the roller tube 921, the input end 962, the output end 961, and the disturbing member 942 are rotating simultaneously. As the housing 941 is stationary, the disturbing member 942 is rotated relative to the housing 941, wherein the rotation of the disturbing member 942 is resisted by the damping oil 943 to generate a damping force so as to reduce the rotational speed of the disturbing member 942, the output end 961, the input end 962, and the roller tube 921. Therefore, the release speed of the covering material 3a is reduced. When the roller tube 921 is rotating in the second direction, the input end 962 rotates in the second direction and disengages from the output end 961, such that the output end 961 and disturbing member 942 are not rotated with the roller tube 921 and the input end 962, so the oil damping module 94 does not provide oil damping effect.

When the covering material 3a is completely collected, the engaging pawl 932 is engaged to the ratchet teeth 9311 of the rotating wheel 931 to lock the rotating wheel 931 from rotation in order to prevent the first direction rotation of the roller tube 921 by the weight force of the bottom rail 2a, whereby restricting the covering material 3a from expanding.

When the control cord 934 is pulled for expanding the covering material 3a, the engaging pawl 932 is pivoted by the control cord 934 to disengage from the ratchet teeth 9311 of the rotating wheel 931 so as to unlock the rotating wheel 931 and the roller tube 921. At this moment, the weight force from the bottom rail 2a drives the roller tube 921 to rotate in the first direction to expand the covering material 3a. During the expansion of the covering material 3a, the drive member 913 is driven by the roller tube 921 so as to twist the coil spring 912 to store the restoring force. The one-way clutch module 96 and the disturbing member 942 of the oil damping module 94 are also driven by the roller tube 912 for generating the damping force to reduce the rotational speed of the roller tube 921, and thus reducing the expanding speed of the covering material 3a. Therefore, the expansion speed of the covering material 3a is reduced. Before the covering material 3a is completely expanded, stop pulling the control cord 934 can pivot the engaging pawl 932 for engaging the ratchet teeth 9311 of the rotating wheel 931 by the resilient member 933 to lock the rotating wheel 931 from rotation in order to stop the first direction rotation of the roller tube 921 by the weight force of the bottom rail 2a, whereby restricting the covering material 3a from expanding.

During the collection of the covering material 3a, the coil spring 912 releases the restoring force to rotate the roller tube 921 in the second direction. Under this condition, the roller tube 921 rotates the input end 962 of the one-way clutch module 96 in the second direction while the input end 962 is disengaged from the output end 961, such that the output end 961 and the disturbing member 942 are not rotated with the roller tube 921, therefore no damping effect is generated.

Figure 44:
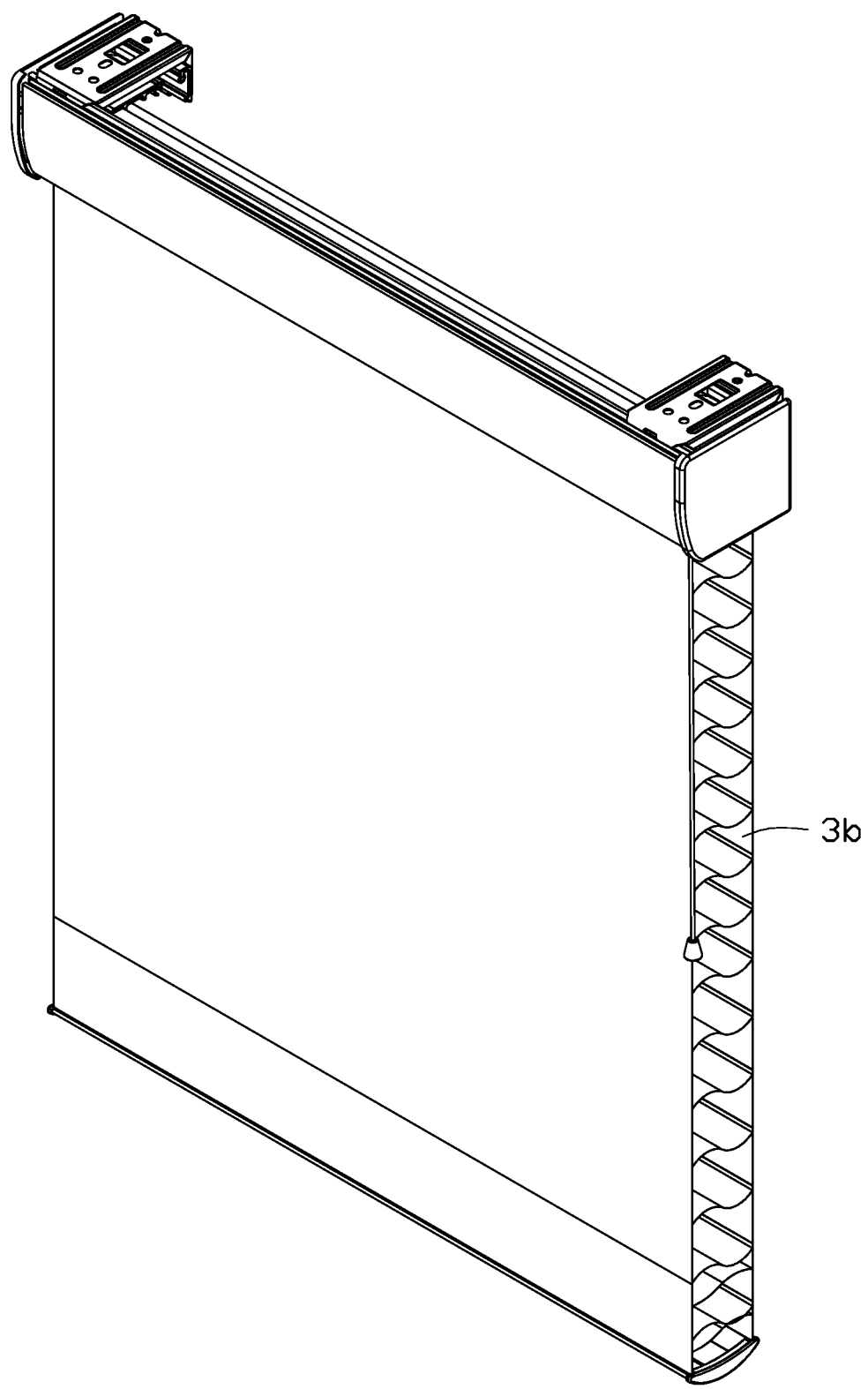
FIG. 44 is a perspective view of another window covering system with the control device in FIG. 39.
Figure 45:
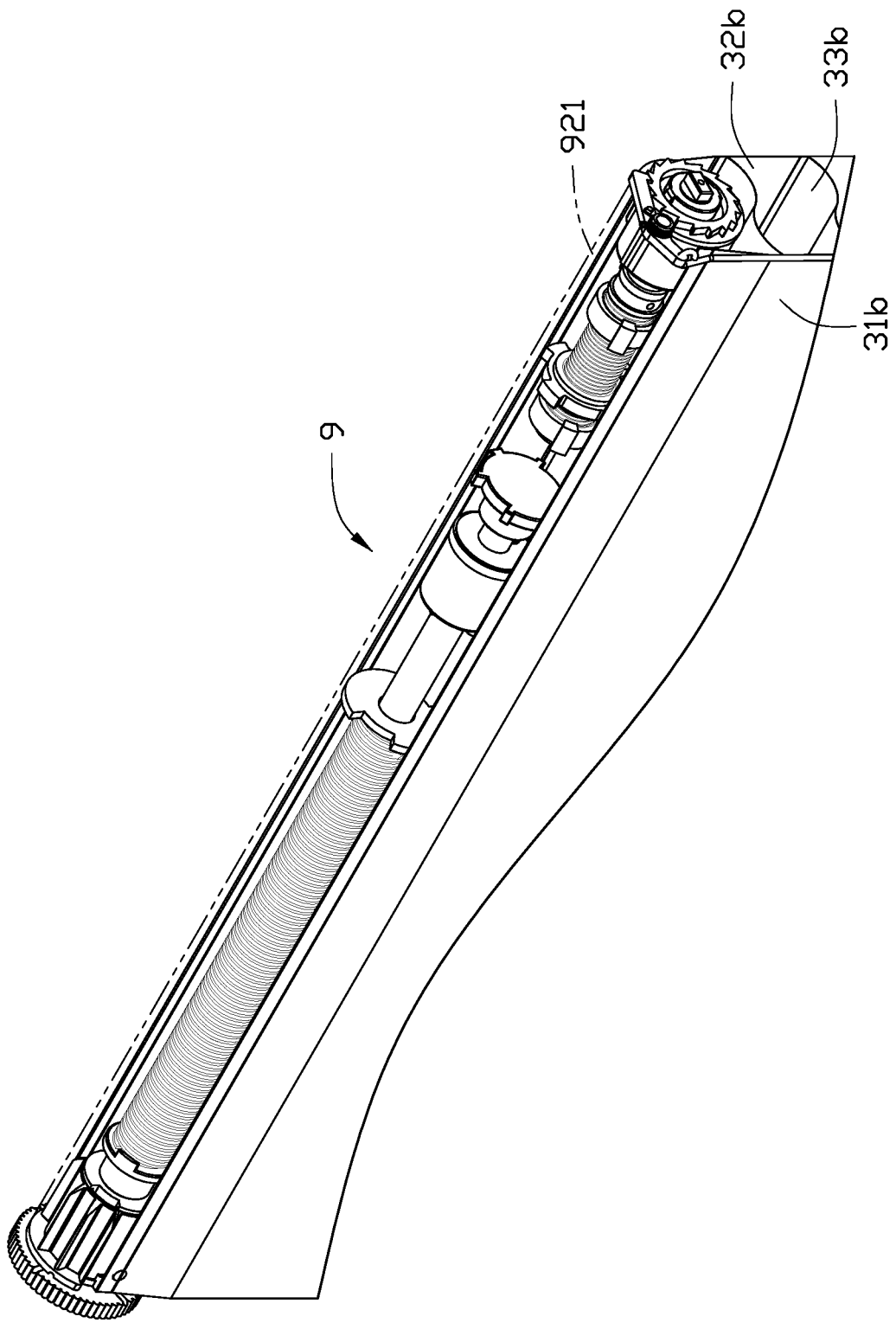
FIG. 45 is a partial perspective view of the window covering system in FIG. 44.
Figure 46:
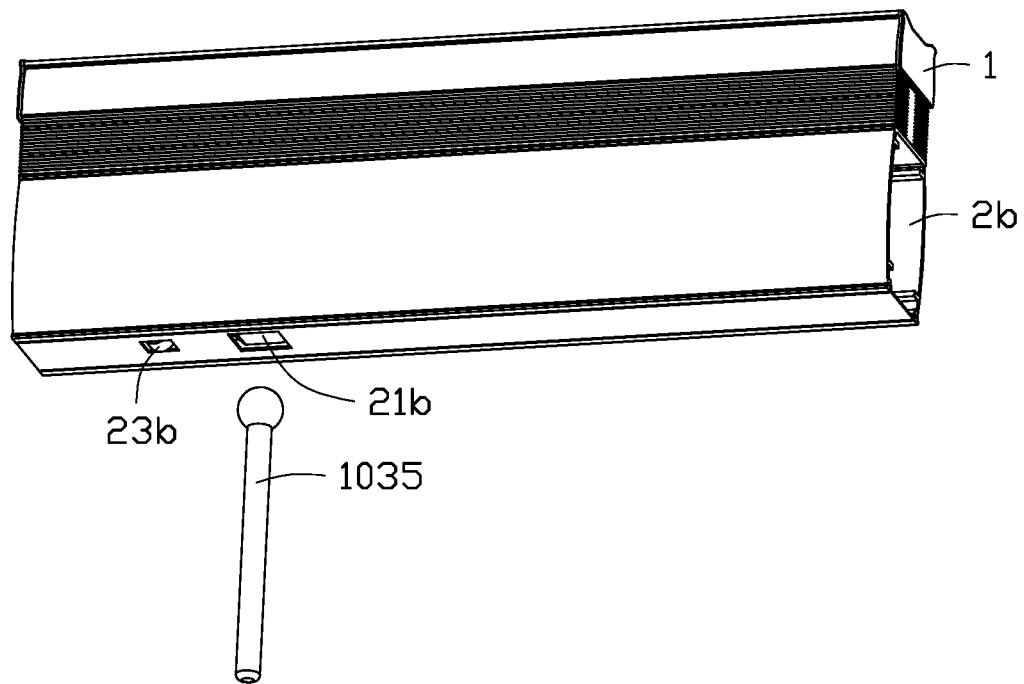
FIG. 46 is a perspective view of a window covering system according to another embodiment of the present disclosure.
Figure 47:
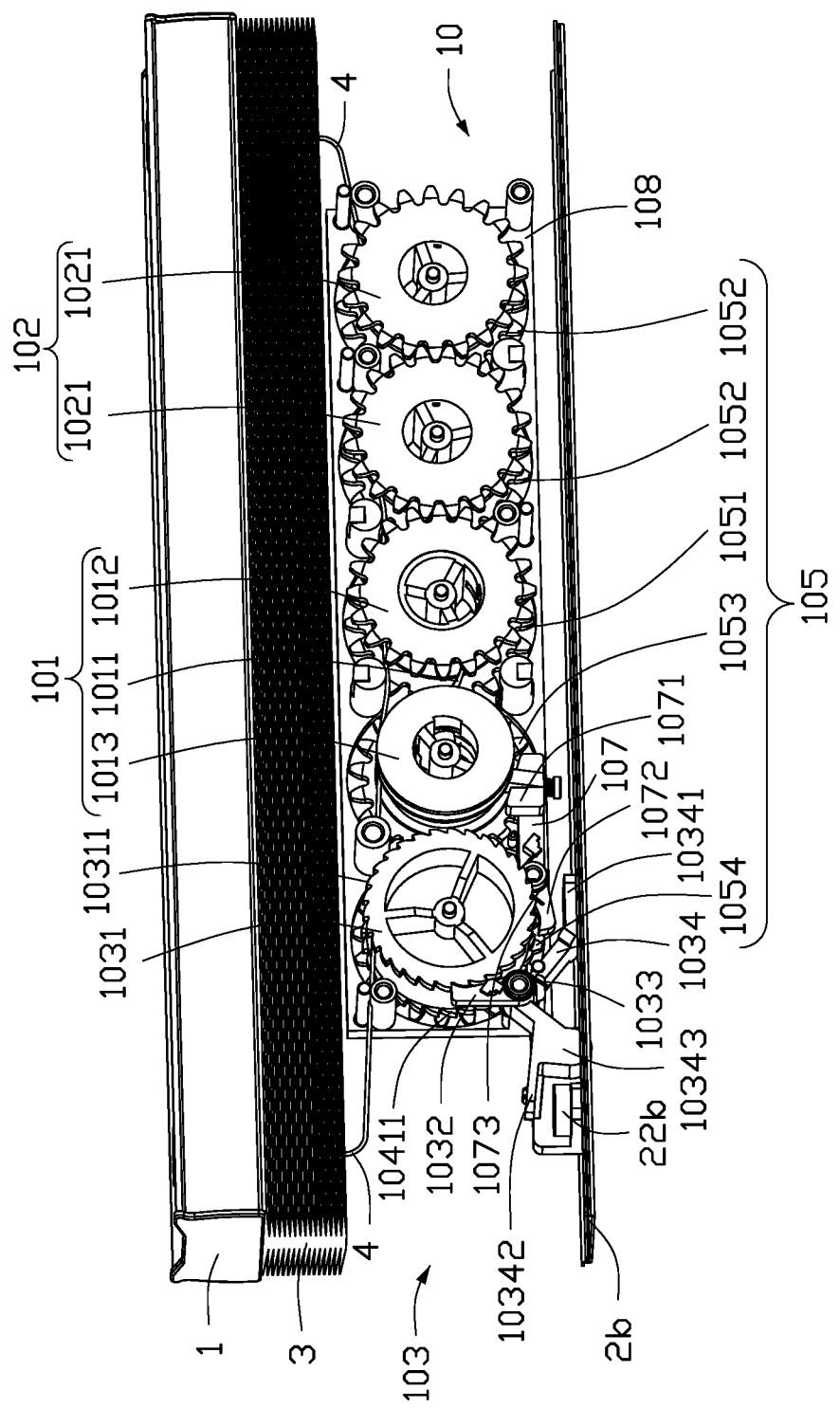
FIG. 47 is a partial perspective view of the window covering system in FIG. 46 shown in a locked condition.
Figure 48:
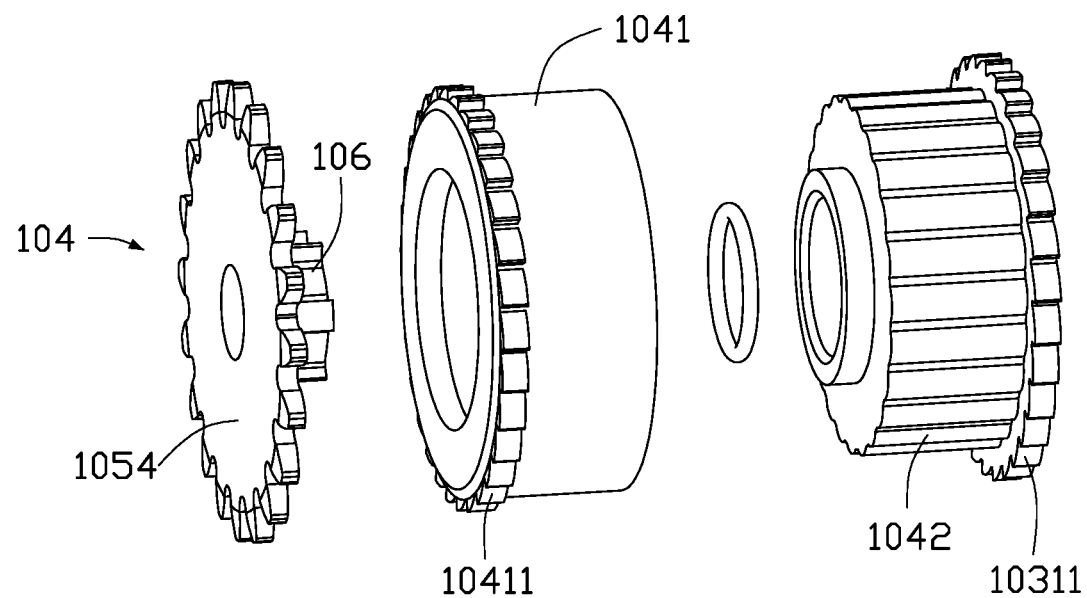
FIG. 48 is an exploded perspective view of a damping module of a control device in FIG. 46.
Figure 49:
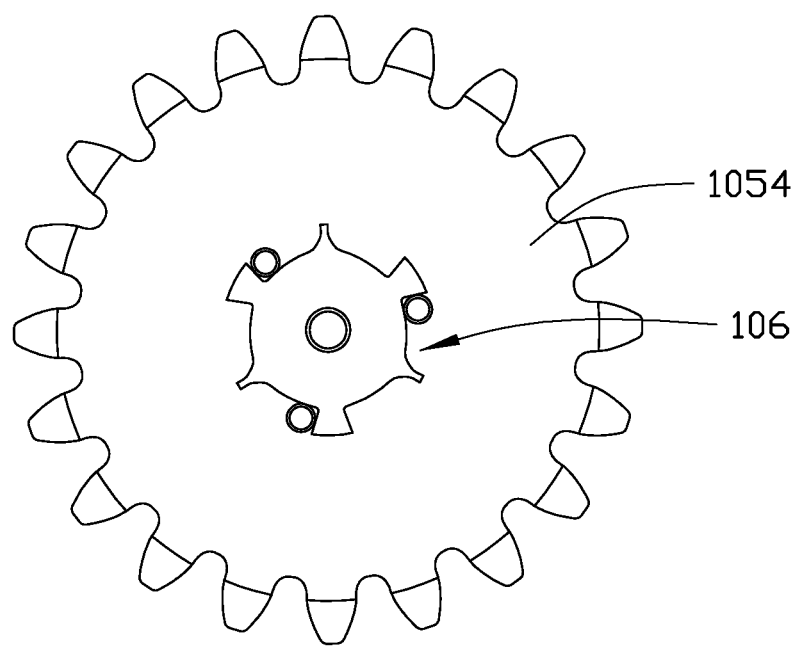
FIG. 49 is a front view of the damping module of the control device in FIG. 46.
Figure 50:
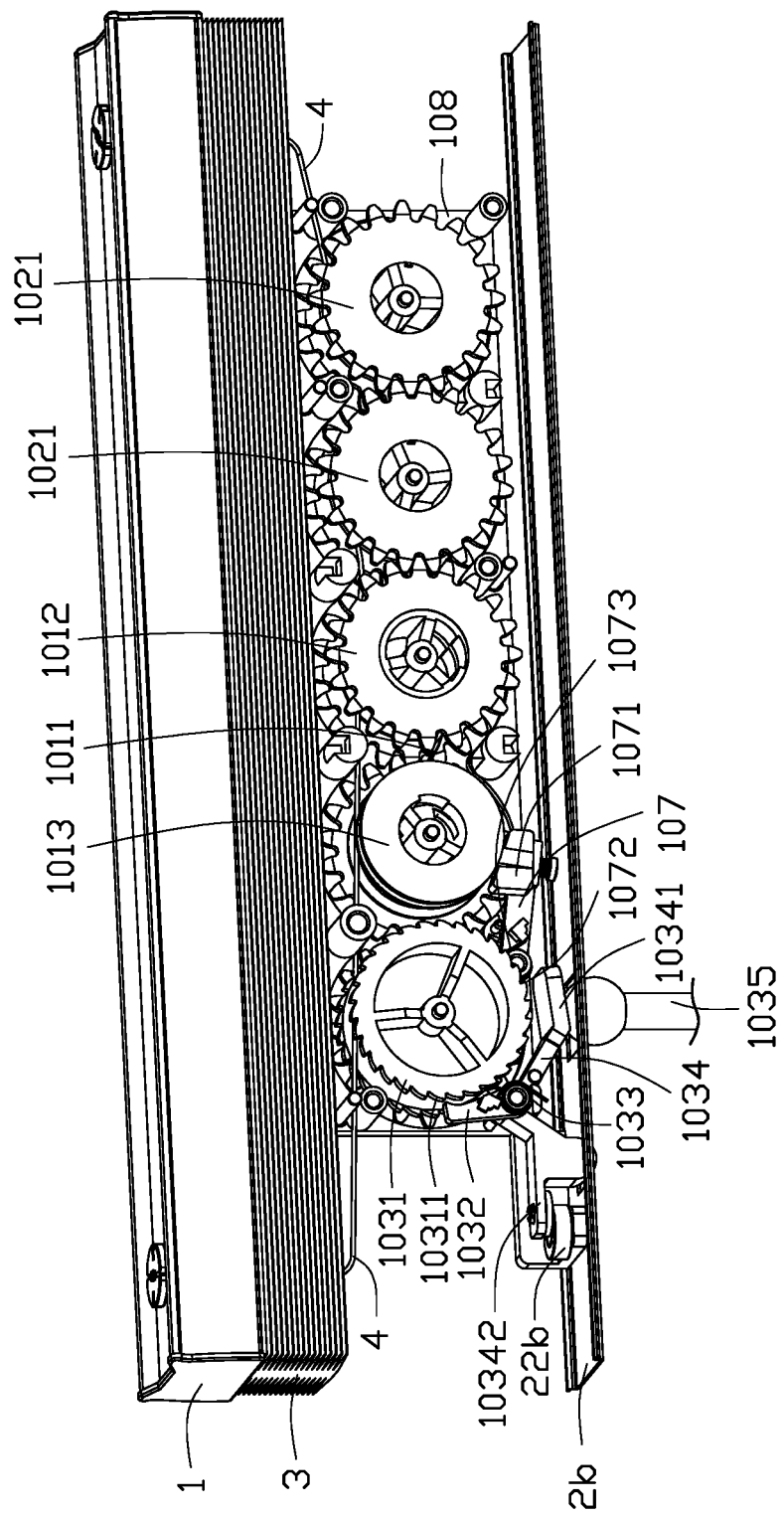
FIG. 50 is a partial perspective view of the window covering system in FIG. 46 shown in an unlocked condition.
Figure 51:
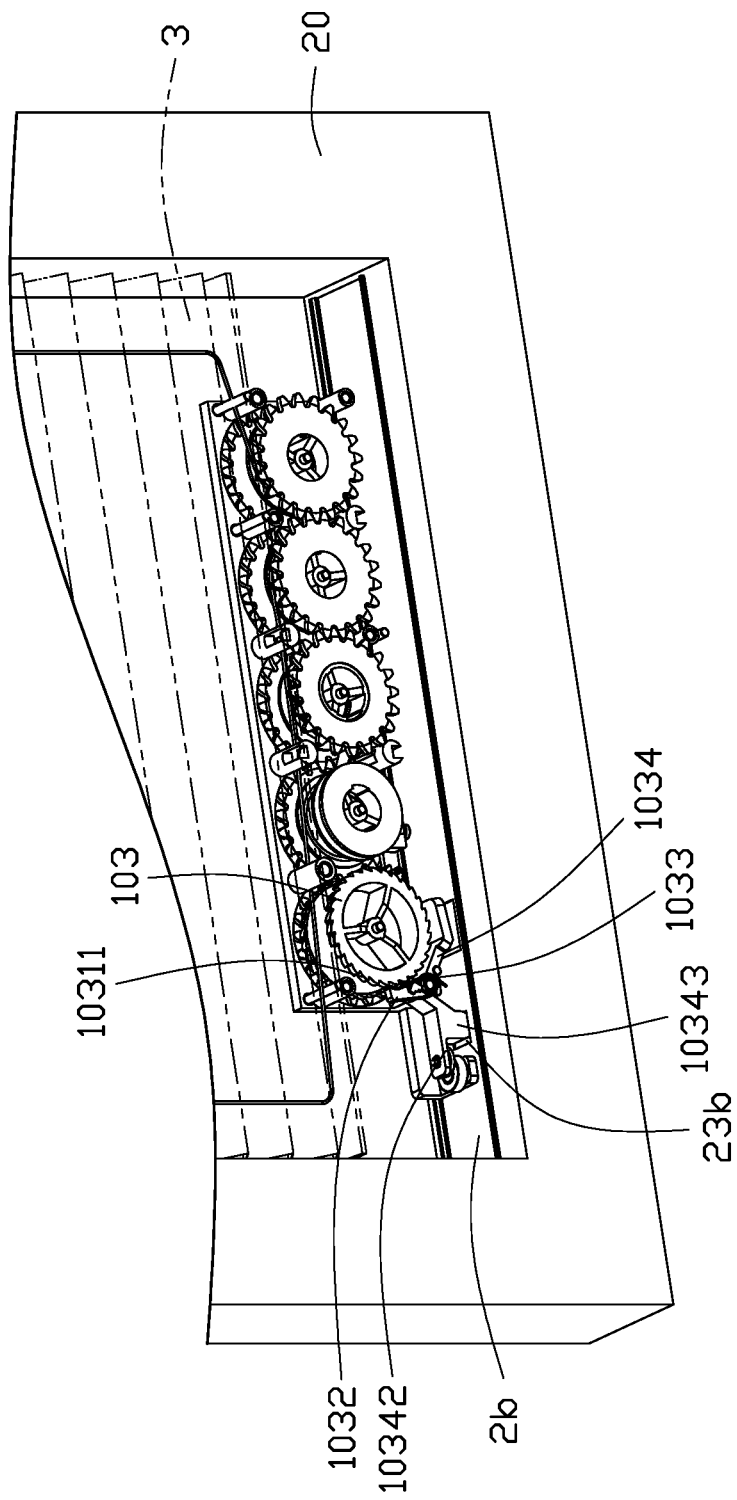
FIG. 51 is a partial perspective view of the control device in FIG. 46 of the window covering system with a window frame.

FIGS. 44 and 45 illustrate the window covering system comprising the control device 9, wherein the window covering system is a sheer shade. The covering material 3b of the sheer shade comprises a front sheet 31b, a back sheet 32b and a plurality of strips 33b, wherein the front sheet 31b and the back sheet 32b are arranged opposite and parallel to each other, and the strips 33b are horizontally connected between the front sheet 31b and the back sheet 32b. When the roller tube 921 is rotated to begin collecting the covering material 3b, at least one of the front sheet 31b and the back sheet 32b is dislocated relative to another, such that the front sheet 31b and the back sheet 32b are close to each other while the strips 33b are vertically oriented. Hence, the covering material 3a can be collected by the roller tube 921, and the operation of the control device 9 is the same as foregoing. For expanding the covering material 3b, the roller tube 921 continue rotating after expanding the covering material 3b completely such that at least one of the front sheet 31b and the back sheet 32b is dislocated relative to another, whereby the strips 33b are oriented horizontally as before, and thus the front sheet 31b and the back sheet 32b are separated.

In one embodiment of the present disclosure, the sheer shade can also employ other damping module or unlocking module other than those in the control device 9.

FIGS. 46-51 illustrate a control device 10 according to one embodiment of the present disclosure. The control device 10 may be mounted in the weight member such as in the bottom rail 2b, but not limited thereto. Alternatively, the control device 10 may also be mounted in the headrail 1. The control device 10 comprises a driving module 101, a lifting module 102, an unlocking module 103, a damping module, and a transmission module 105 which are positioned one after another. The driving module 101, the lifting module 102, and the unlocking module 103 are operated simultaneously through the transmission module 105.

The driving module 101 comprises a first spiral spring 1011, a drive member 1012 and a storage member 1013. The first spiral spring 1011 comprises two ends, wherein one end of the first spiral spring 1011 is secured to the drive member 1012, and the other end of the first spiral spring 1011 is secured to the storage member 1013. While the covering material 3 is expanding, the first spiral spring 1011 winds reversely from the storage member 1013 to the drive member 1012 to store a restoring force, wherein the restoring force is less than the weight force of the bottom rail 2b and the control device 10. While the covering material 3 is collecting, the first spiral spring 1011 rewinds from the drive member 1012 to the storage member 1013 to release the restoring force.

The lifting module 102 comprises a winding device 1021. The end of the lift cord 4, which connects the bottom rail 2b, is secured to the winding device 1021. The winding device 1021 is rotated in a first direction to release the lift cord 4 for expanding the covering material 3; and the winding device 1021 is rotated in a second direction to collect the lift cord 4 for collecting the covering material 3.

The unlocking module 103 comprises a rotating member, a locking member, and a control member. The rotating member is a rotating wheel 1031 which comprises ratchet teeth 10311 on its outer periphery. The locking member is an engaging pawl 1032 which is pivotally mounted in the bottom rail 2b for engaging to or disengaging from the ratchet teeth 10311 of the rotating wheel 1031. When the rotating wheel 1031 is about to rotate in the direction of expanding the covering material 3, the engaging pawl 1032 abuts the ratchet teeth 10311 such that locks the rotating wheel 1031 from rotating. A resilient member 1033 secured to the bottom rail 2b is configured to urge the engaging pawl 1032 to always engage to the ratchet teeth 10311 of the rotating wheel 1031 when no external force is acting upon the engaging pawl 1032. A lever 1034 is secured to the same pivot of the engaging pawl 1032, such that the lever 1034 and the engaging pawl 1032 can be pivoted simultaneously. The lever 1034 comprises a pushing end 10341 and a limiting end 10342. At the bottom of the bottom rail 2b, a first hole 21b and a second hole 23b are defined, wherein the first hole 21b corresponds to the pushing end 10341 of the lever 1034 such that the pushing end 10341 can be pushed from the bottom of the bottom rail 2b for pivoting the lever 1034 and the engaging pawl 1032. A protrusion 10343 extends downward from the limiting end 10342 of the lever 1034 through the second hole 23b. An attracting member 22b is secured to the bottom rail 2b corresponding to the limiting end 10342 such that the attracting member 22b is able to attract the limiting end 10342 of the lever 1034. The control member is a push rod 1035 for pushing the pushing end 10341 of the lever 1034 via the first hole 21b to pivot the lever 1034 and the engaging pawl 1032.

The damping module comprises a first damping member and a second damping member disposed corresponding to each other such that a damping force can be generated in between when the second damping member is rotated relative to the first damping member. In one embodiment of the present disclosure, the damping module may be an oil damping module 104. The first damping member is a housing 1041 having gear teeth 10411 on its outer periphery, and the second damping member is a disturbing member 1042 arranged within the housing 1041, wherein the disturbing member 1042 is secured to or integrally formed coaxially at one surface of the rotating wheel 1031. A damping oil is filled between the housing 1041 and the disturbing member 1042. The damping force is generated when the disturbing member 1042 is rotated relative to the housing 1041 by the rotating wheel 1031, and no damping force is generated when the housing 1041 and the disturbing member 1042 rotate simultaneously.

The transmission module 105 comprises a first transmission wheel 1051, a second transmission wheel 1052, a third transmission wheel 1053, and a fourth transmission wheel 1054. The first transmission wheel 1051 is connected to one end of the drive member 1012 and is rotated with the drive member 1012 simultaneously. The second transmission wheel 1052 is connected to one end of the winding device 1021 and is rotated with the winding device 1021 simultaneously. The third transmission wheel 1053 is connected to one end of the storage member 1013 but is not rotated with the storage member 1013. The fourth transmission wheel 1054 is connected to one end of the rotating wheel 1031, and a one-way clutch module 106 is provided in between such that the fourth transmission wheel 1054 is rotated with the rotating wheel 1031 in only one direction. The rotating wheel 1031 is engaged to the fourth transmission wheel 1054 through the one-way clutch module 106 when the rotating wheel 1031 and the fourth transmission wheel 1054 are rotating for expanding the covering material 3. The rotating wheel 1031 is disengaged from the fourth transmission wheel 1054 through the one-way clutch module 106 when the fourth transmission wheel 1054 is rotating for collecting the covering material 3.

A detecting member 107 is pivotally mounted about a pivot in the bottom rail 2b, wherein the detecting member 107 comprises a detecting end 1071 and a claw end 1072 with the pivot in between. A resilient member 1073 secured to the bottom rail 2b can urge the detecting member 107 such that the detecting end 1071 of the detecting member 107 always abuts an outer periphery of the first spiral spring 1011 on the storage member 1013. Variation in outer diameter of the first spiral spring 1011 on the storage member 1013 cause the detecting end 1071 of the detecting member 107 to move so as to pivot the detecting member 107 such that the claw end 1072 of the detecting member 107 can engage to or disengage from the gear teeth 10411 of the housing 1041.

In one embodiment of the present disclosure, the control device 10 may further comprise a base 108. The aforementioned components of the control device 10 can be assembled on the base 108, and the engaging pawl 1032, the lever 1034, the resilient member 1033, the resilient member 1073, and the detecting member 107 are pivotally mounted on the base 108. Thus, the control device 10 can be manufactured as a single modular device which can be easily mounted.

When the covering material 3 is completely collected, the weight force from the bottom rail 2b and the control device 10 causes the winding device 1021 to have a rotating force in a direction of expanding the covering material 3, as well as the rotating wheel 1031 has the rotating force because of the simultaneous operation with the winding device 1021 through the transmission module 105 and engagement between the rotating wheel 1031 and the fourth transmission wheel 1054 via to the one-way clutch module 106. However, the engaging pawl 1032 is engaged to the ratchet teeth 10311 of the rotating wheel 1031 to lock the rotating wheel 1031 from rotation in order to prevent the covering material 3 from expanding by the weight force of the bottom rail 2b and the control device 10. Therefore, the winding device 1021 and the transmission module 105 are also locked from rotation.

When the push rod 1035 is pushed for expanding the covering material 3, the pushing end 10341 of the lever 1034 is driven by the push rod 1035 to pivot the lever 1034 and the engaging pawl 1032, and the limiting end 10342 of the lever 1034 is attracted by the attracting member 22b in the bottom rail 2b, wherein the engaging pawl 1032 disengages from the ratchet teeth 10311 of the rotating wheel 1031, whereby unlocking the rotating wheel 1031, as well as unlocking the transmission module 105 and the winding device 1021. At this time, the bottom rail 2b and the control device 10 descend to drive the winding device 1021 of the lifting module 102 to rotate in the first direction for releasing the lift cord 4 in order to expand the covering material 3, because the weight force of the bottom rail 2 and the control device 10 is greater than the restoring force provided by the first spiral spring 1011 to the drive member 1012. Meanwhile, the drive member 1012 of the driving module 101 rotates to wind the first spiral spring 1011 reversely from the storage member 1013 for storing the restoring force, whereby driving the rotating wheel 1031 to rotate in a direction of expanding the covering material 3.

During the expansion of the covering material 3, the first spiral spring 1011 is reverse wound from the storage member 1013 to the drive member 1012 to store the restoring force, hence the outer diameter of the first spiral spring 1011 on the storage member 1013 is at largest as the covering material 3 just start expanding, thus the detecting end 1071 of the detecting member 107 abuts the outer periphery of the first spiral spring 1011, whereby the claw end 1072 of the detecting member 107 engages to the gear teeth 10411 of the housing 1041 for locking the housing 1041 from rotation. Meanwhile, the disturbing member 1042 is rotated by the rotating wheel 1031 within the housing 1041, wherein rotation of the disturbing member 1042 is resisted by the damping oil such that the damping force is generated, whereby reducing the rotational speed of the disturbing member 1042 and the rotating wheel 1031, as well as reducing the rotational speed of the winding device 1021 through the transmission module 105, thus releasing of the lift cord 4 is slowed, therefore damping effect is provided to slow the expansion of the covering material 3. The outer diameter of the first spiral spring 1011 on the storage member 1013 reduces as the first spiral spring 1011 is unwound by the storage member 1013, and the detecting end 1071, which abuts the outer periphery of the first spiral spring 1011, moves closer to the center of the storage member 1013 such that pivots the detecting member 107, and thus the claw end 1072 moves away from the housing 1041. When the claw end 1072 disengages from the gear teeth 10411 of the housing 1041, the housing 1041 of the oil damping module 104 is not restricted from rotation, thus the housing 1041 is driven by the disturbing member 1042 to rotate simultaneously with the rotating wheel 1031 such that stops generation of the damping force, whereby the damping effect is removed at a specific timing as the covering material 3 expands until the covering material 3 expands completely.

The covering material 3 stops expanding when the engaging pawl 1032 is pivoted by the resilient member 1033 to engage the ratchet teeth 10311 of the rotating wheel 1031 while the lever 1034 is pivoted as the protrusion 10343 of the lever 1034 is pushed through the hole 23*b* at the bottom of the bottom rail 2*b* such that frees the limiting end 10342 from attraction of the attracting member 22*b*, wherein the protrusion 10343 can be pushed by the push rod 1035 manually, or the protrusion 10343 can be pushed by the window frame 20 when the covering material 3 is completely expanded that the bottom rail 2*b* touches the window frame 20.

During the collection of the covering material 3, the first spiral spring 1011 is rewound from the drive member 1012 to the storage member 1013 to release the restoring force so as to rotate the drive member 1012 and the transmission module 105, whereby rotating the winding device 1021 in the second direction for collecting the lift cord 4 in order to collect the covering material 3. Meanwhile, the rotating wheel 1031 is disengaged from the fourth transmission wheel 1054 through the one-way clutch module 106 such that the rotating wheel 1031 and the oil damping module 104 are not rotated. Therefore, no oil damping effect is generated while collecting the covering material 3.

The exemplary embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to, and including, the full extent established by the broad general meaning of the terms used in the claims. It will therefore be appreciated that the exemplary embodiments described above may be modified within the scope of the claims.

What is claimed is:

1. A control device for reducing an expansion speed of a covering material of a window covering system, the window covering system comprises the control device, the covering material and a weight member attached below the covering material to provide a weight force to the covering material, and the control device comprising:
    a driving module comprising:
    a drive member; and
    a spring having two ends, wherein one end is connected to the drive member to provide a restoring force to the drive member to resist the weight force of the weight member, and the restoring force is less than the weight force;
    a lifting module comprising:
    a winding device configured to operate with the drive member and the covering material simultaneously, and wherein the winding device is rotated in a first direction when the covering material is expanded;
    an unlocking module comprising:
    a rotating member configured to operate with the winding device simultaneously; a locking member configured to lock the rotating member so as to restrict the first direction rotation of the winding device; and
    a control member configured to drive the locking member to unlock the rotating member so as to allow the winding device to rotate in the first direction; and
    a damping module configured to operate with the winding device simultaneously in only one direction for providing a damping force to the winding device selectively, wherein the damping force is provided to the winding device for reducing the expansion speed of the covering material when the winding device is rotated in the first direction, and wherein no damping force is provided to the winding device when the winding device is rotated in a second direction opposite to the first direction; wherein the control member is configured to be moved by a force other than the restoring force provided by the spring, whereby to drive the locking member to unlock the rotating member so as to allow the winding device to rotate in the first direction;
    wherein a speed change module is provided between the rotating member and the damping module, and the speed change module comprises gears of different gear ratios.

2. The control device of claim 1, wherein
    the rotating member of the unlocking module is a rotating wheel which is configured to operate with the winding device simultaneously;
    the locking member of the unlocking module is configured to engage to the rotating wheel for locking the rotating wheel from rotating in the first direction; and
    the control member of the unlocking module is configured to drive the locking member to unlock the rotating wheel so as to allow the winding device to rotate in the first direction.

3. The control device of claim 2, wherein
    the rotating wheel has gear teeth on its outer periphery;
    the locking member is an engaging pawl configured to engage the gear teeth of the rotating wheel selectively, wherein the rotating wheel is locked from rotation for restricting the first direction rotation of the winding device when the engaging pawl engages the gear teeth of the rotating wheel; and
    the control member is configured to drive the engaging pawl to disengage from the gear teeth of the rotating wheel to unlock the rotating wheel so as to allow the winding device to rotate in the first direction.

4. The control device of claim 3, wherein the unlocking module further comprise a resilient member connected to the engaging pawl, wherein the resilient member is configured to urge the engaging pawl to engage to the gear teeth of the rotating wheel when no external force is acting upon the engaging pawl.

5. The control device of claim 2, wherein
the rotating wheel has a friction surface on its outer periphery;
the locking member is a friction pawl to selectively abut the friction surface of the rotating wheel, and the friction pawl is configured to abut the friction surface of the rotating wheel to lock the rotating wheel from rotation so as to restrict the first direction rotation of the winding device; and
the control member is configured to drive the friction pawl away from the friction surface of the rotating wheel for unlocking the rotating wheel so as to allow the winding device to rotate in the first direction.

6. The control device of claim 5, wherein the unlocking module further comprises a resilient member connected to the friction pawl, wherein the resilient member is configured to urge the friction pawl to abut the friction surface of the rotating wheel when no external force is acting upon the engaging pawl.

7. The control device of claim 2, wherein
the locking member is a clutch comprising:
an input portion;
a fixed portion coaxially disposed around the input portion; and
a clutch assembly provided between the input portion and the fixed portion to selectively engage the input portion with the fixed portion;
wherein, the input portion is configured to engage the fixed portion to lock the rotating wheel from rotation so as to restrict the first direction rotation of the winding device; and
the control member is configured to drive the input portion of the clutch assembly to disengage from the fixed portion of the clutch assembly for unlocking the rotating wheel so as to allow the winding device to rotate in the first direction.

8. The control device of claim 7, wherein
the clutch assembly of the locking member comprises at least one space with a wide end and a narrow end, wherein the at least one space is defined between the input portion and the fixed portion; and
at least one roller corresponding to the at least one space and configured to move between the wide end and the narrow end of the at least one space;
the input portion engages to the fixed portion to lock the rotating wheel from rotation for restricting the first direction rotation of the winding device when the at least one roller moves to the narrow end;
the control member is a disc having at least one projection which is arranged in the at least one space, wherein the projection k configured to move the roller toward the wide end of the at least one space, and the input portion disengages from the fixed portion to unlock the rotating wheel so as to allow the winding device to rotate in the first direction when the roller is at the wide end.

9. The control device of claim 1, wherein
the damping module has a first damping member and a second damping member disposed corresponding to each other, wherein one of the first damping member and the second damping member is configured to rotate relative to the other when the winding device rotates in the first direction.

10. The control device of claim 9, wherein
a one-way clutch module is provided between the winding device and the damping module; and
the winding device is configured to rotate the second damping member through the one-way clutch module when the winding device rotates in the first direction such that the second damping member is rotated relative to the first damping member to generate a damping force.

11. The control device of claim 10, wherein
the one-way clutch module is provided between the winding device and the rotating member;
the rotating member is configured to operate simultaneously with the second damping member of the damping module; and
the rotating member is configured to drive the second damping member to rotate relative to the first damping member for generating the damping force when the rotating member is driven by the winding device rotating in the first direction, wherein the winding device drives the rotating member through the one-way clutch module.

12. The control device of claim 10, wherein
the first damping member is a fixed magnet;
the second damping member is a conductor corresponding to the magnet, wherein the conductor is configured to operate with the winding device simultaneously such that the conductor is driven by the winding device to rotate relative to the magnet for generating the damping force.

13. The control device of claim 10, wherein
the first damping member is a fixed recess;
the second damping member comprises
a plate disposed in the recess and configured to operate with the winding device simultaneously; and
at least one friction block pivotally mounted to the plate; and
the damping force is generated when the plate is driven by the winding device such that the at least one friction block pivots outwardly and rubs the recess.

14. The control device of claim 10, wherein
the first damping member is a housing;
the second damping member is a disturbing member disposed in the housing and configured to operate with the winding device simultaneously;
a fluid is filled between the housing and the disturbing member; and
wherein the damping force is generated when the disturbing member is driven by the winding device such that the disturbing member rotates relative to the housing.

* * * * *